(12) United States Patent
Starzyk

(10) Patent No.: US 7,293,002 B2
(45) Date of Patent: Nov. 6, 2007

(54) SELF-ORGANIZING DATA DRIVEN LEARNING HARDWARE WITH LOCAL INTERCONNECTIONS

(75) Inventor: Janusz A. Starzyk, Athens, OH (US)

(73) Assignee: Ohio University, Athens, OH (US)

( * ) Notice: Subject to any disclaimer, the term of this patent is extended or adjusted under 35 U.S.C. 154(b) by 479 days.

(21) Appl. No.: 10/174,038

(22) Filed: Jun. 18, 2002

(65) Prior Publication Data

US 2003/0055799 A1    Mar. 20, 2003

Related U.S. Application Data

(60) Provisional application No. 60/299,254, filed on Jun. 19, 2001.

(51) Int. Cl.
    *G06F 15/00* (2006.01)
(52) U.S. Cl. .................... 706/15; 706/16; 706/26; 706/27; 706/31
(58) Field of Classification Search .............. 706/15, 706/16, 19, 20, 25, 26, 27, 31, 32, 39
    See application file for complete search history.

(56) References Cited

U.S. PATENT DOCUMENTS

| | | | | |
|---|---|---|---|---|
| 4,914,603 | A | * | 4/1990 | Wood ..................... 706/25 |
| 5,113,483 | A | * | 5/1992 | Keeler et al. .............. 706/25 |
| 5,150,450 | A | * | 9/1992 | Swenson et al. ............ 706/25 |
| 5,155,802 | A | * | 10/1992 | Mueller et al. ............ 706/39 |
| 5,165,009 | A | | 11/1992 | Watanabe et al. |
| 5,222,193 | A | | 6/1993 | Brooks et al. |
| 5,235,672 | A | | 8/1993 | Carson |
| 5,350,953 | A | | 9/1994 | Swenson et al. |
| 5,371,834 | A | | 12/1994 | Tawel |
| 5,408,424 | A | | 4/1995 | Lo |
| 5,426,745 | A | * | 6/1995 | Baji et al. ................ 345/469 |
| 5,434,951 | A | * | 7/1995 | Kuwata ................... 706/28 |
| 5,479,579 | A | | 12/1995 | Duong et al. |
| 5,594,597 | A | | 1/1997 | Padden |
| 5,604,840 | A | | 2/1997 | Asai et al. |
| 5,625,752 | A | | 4/1997 | Swenson |
| 5,631,469 | A | | 5/1997 | Carrieri et al. |

(Continued)

FOREIGN PATENT DOCUMENTS

WO    WO 92/15062    9/1992

OTHER PUBLICATIONS

Haykin Simon, "Neural Networks A Comprehensive Foundation", 1994, pp. 8,352-354, 408.*

(Continued)

*Primary Examiner*—David Vincent
*Assistant Examiner*—Omar F Fernández Rivas
(74) *Attorney, Agent, or Firm*—Calfee, Halter & Griswold LLP

(57) ABSTRACT

A method for organizing processors to perform artificial neural network tasks is provided. The method provides a computer executable methodology for organizing processors in a self-organizing, data driven, learning hardware with local interconnections. A training data is processed substantially in parallel by the locally interconnected processors. The local processors determine local interconnections between the processors based on the training data. The local processors then determine, substantially in parallel, transformation functions and/or entropy based thresholds for the processors based on the training data.

44 Claims, 20 Drawing Sheets

U.S. PATENT DOCUMENTS

| | | | |
|---|---|---|---|
| 5,649,065 | A | 7/1997 | Lo et al. |
| 5,649,070 | A | 7/1997 | Connell et al. |
| 5,701,398 | A | 12/1997 | Glier et al. |
| 5,781,702 | A | 7/1998 | Alhalabi |
| 5,842,189 | A * | 11/1998 | Keeler et al. .................. 706/16 |
| 6,061,673 | A * | 5/2000 | Tang ........................... 706/25 |
| 6,332,137 | B1 | 12/2001 | Hori et al. |
| 6,366,897 | B1 | 4/2002 | Means et al. |
| 6,876,988 | B2 * | 4/2005 | Helsper et al. ................ 706/21 |
| 6,879,971 | B1 * | 4/2005 | Keeler et al. .................. 706/21 |
| 6,983,265 | B2 | 1/2006 | Tannhof et al. |
| 2003/0014378 | A1 * | 1/2003 | Goodnight et al. ........... 706/21 |

OTHER PUBLICATIONS

Haykin Simon, "Neural Networks, A Comprehensive Foundation", 1994, pp. 8, 352-354, 408.*

Gurney Kevin, "An Introduction to Neural Networks", 1997, pp. 1-53, 72-73, 114-127, 144-145.*

Gurney Kevin, "An Introduction to Neural Networks", 1997, pp. 1-53, 72-73, 114-127, 144-145.*

He, "Neural Network and Its Application in IR", UIUCLIS (1999).

Lendaris, "On the Definition of Self-Organizing Systems", Proceedings of the IEEE, (1964), vol. 52.

Lendaris, et al., "Self-Organization: Meaning and Means", (1965) Information Systems Sciences, Proceedings of the Second Congress.

Liu, et al., "Evoluntionary Ensembles with Negative Correlation Learning", IEEE Trans. On Evolutionary Computation, (2000), vol. 4, No. 4.

Kohonen, "The 'Neural' Phonetic Typewriter", Computer, (1988) IEEE, vol. 21, No. 3, pp. 11-22.

Kohonen, et al., "Self-Organizing Maps", (1995) Berlin: Springer-Verlag, pp. 77-130.

Michie, et al., "Machine Learning, Neural and Statistical Classification", London U.K. Ellis Horwood Ltd. (1994).

Mulier, et al., "Self-Organization as an Iterative Kernel Smoothing Process", Neural Computation 7, (1995) Mass. of Inst. of Tech.

"Topic 9—Neural Network Implementation", NgeeAnn The Polytechnic of Industry School of Engineering (Jul. 2002).

"Neural Control Methodologies—Deliverable for Task 2.2", Neural Control Methodologies (1996) printed from the Internet on Jul. 31, 2006.

Russell, "Neural Networks", The Journal of Undergraduate Mathematics and its Applications (UMAP) (1993).

Upegui, et al., "A methodology for evolving spiking neural-network topologies on the line using partial dynamic reconfiguration", Proceedings of ICCI (2003).

Danese, et al., "A Parallel Neural Processor for Real-Time Applications", IEEE Micro (2002).

"The Basics of Neural Network (NN) Technology", JM & Co/AJRA (1997).

Haykin, "Neural Networks—A Comprehensive Foundation", Macmillan College Publishing Company, Inc. (1994), pp. 8-13, 18-22, 49-55, 65, 66, 352-363, 397-424, 444, 445.

Haykin, "Neural Networks—A Comprehensive Foundation", Prentice-Hall, Inc. (2nd ed. 1999), pp. xii-xiv, 419-422, 461-465, 467-470, 512, 522-524.

Hanggi, et al., "Cellular Neural Networks—Analysis, Design and Optimization", Kluwer Academic Publishers (2000), Preface, Chapters 1-3 and 5-7.

Starzyk, et al., "Self-Organizing Learning Array", IEEE Transactions on Neural Networks, (Mar. 2005), vol. 16, No. 2.

"Genetic Algorithms & Artificial Neural Networks", Wesley R. Elsberry, presented at Assoc. for Computing Machinery, Ft. Worth, Texas, Spring 1988 (6 pgs.).

"Adaptive Logic Networks Technical Overview", Dendronic Decisions Limited (Internet article, Aug. 13, 2002) (6 pgs).

"A Parallel Dynamically Reconfigurable Architecture Designed for Flexible Application-Tailored Hardware/Software Systems in Future Mobile Communication", Becker, et al., *Journal of Supercomputing*, 19(1) pp. 105-127, 2001.

\* cited by examiner

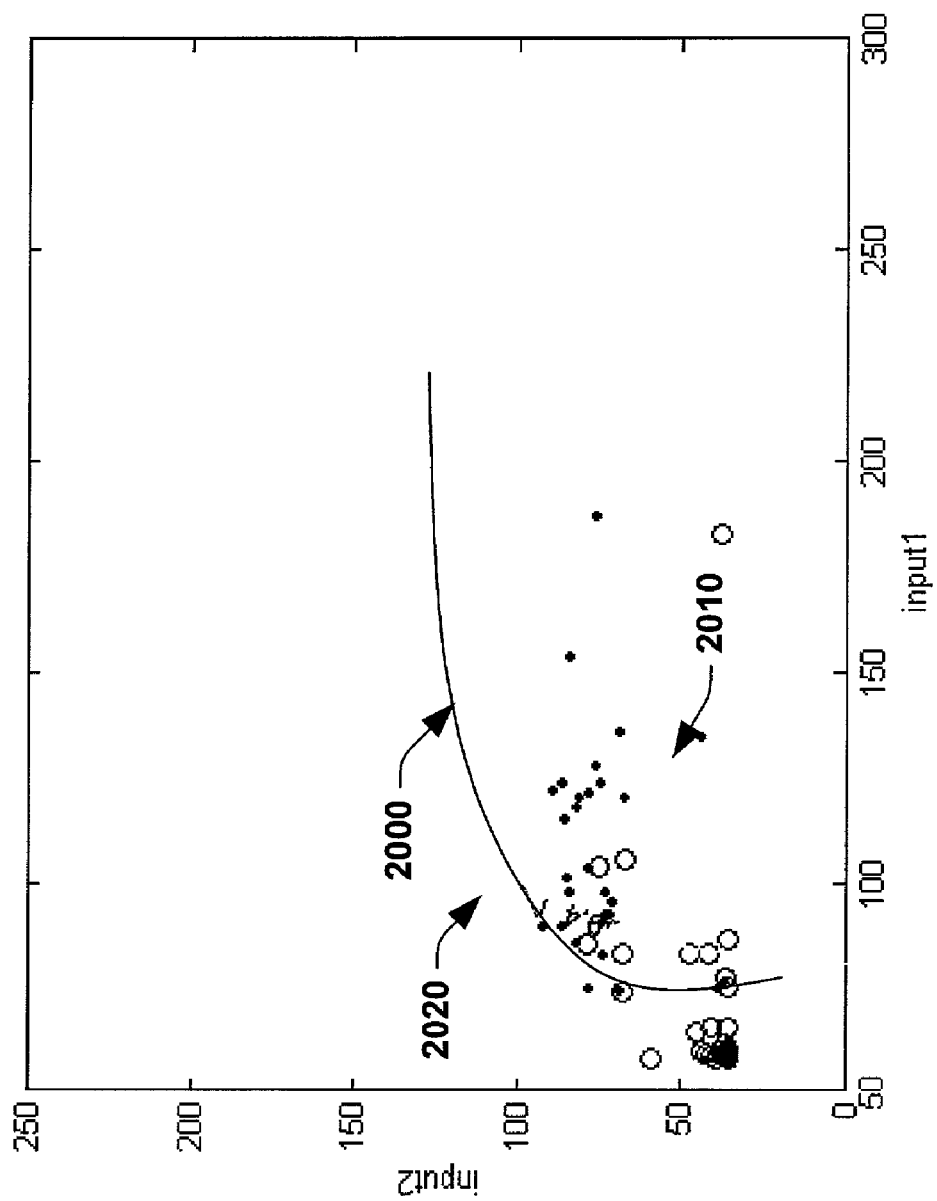

SELF-ORGANIZING DATA DRIVEN LEARNING HARDWARE WITH LOCAL INTERCONNECTIONS

CROSS REFERENCE TO RELATED APPLICATIONS

This application claims the benefit of U.S. Provisional Application No. 60/299,254 filed Jun. 19, 2001, entitled SELF-ORGANIZING DATA DRIVEN LEARNING HARDWARE WITH LOCAL INTERCONNECTIONS.

TECHNICAL FIELD

The systems and methods described herein relate generally to computer hardware organization and more particularly to a self-organizing, data driven, neural network architecture.

BACKGROUND

Conventional neural network architectures may feature globally interconnected layers of processing components. A processing component of one layer of the neural network architecture is connected to all the processing components in another layer. This can lead to concerns about wiring. For example, as the number of processing components increases linearly, the number of wires required to maintain global interconnection increases quadratically. Furthermore, the length of wires required to maintain global interconnection increases linearly. Thus, the amount of wire increases cubically. This limits conventional global interconnection systems.

Conventional neural network architectures may also be organized in a manner where approximating functions are expressed as a sum of products. The sum of products organization can lead to a rapid expansion of terms in complex problems.

Conventional neural network training can involve significant off-line, serial processing of values, weights, thresholds and other computational data. Typically, neural network training involves a global simulation of neuronal behavior and adjustment of weights on connections between processing components, inputs, and/or outputs. The typical training employs off line approximations that grow rapidly in processing time as the complexity of the neural network (e.g., number of neurons, number of layers) increases. When substantially all the training calculations are performed in serial by a single processor or a small set of cooperating processors, training large, complex neural networks becomes computationally infeasible.

In traditional neural network architectures, substantially all the processing components perform a similar transformation function on a fixed set of inputs. While the function may be similar, the processing component may be assigned a local threshold value for the transformation function. Again, central calculation and recalculation of the threshold value can be computationally cumbersome. Furthermore, having substantially all the processing components perform a similar transformation function may make conventional architectures less flexible than is possible.

SUMMARY

The following presents a simplified summary of methods and systems for a self-organizing, data-driven learning array to facilitate providing a basic understanding of these items. This summary is not an extensive overview and is not intended to identify key or critical elements of the methods and systems or to delineate the scope of these items. This summary provides a conceptual introduction in a simplified form as a prelude to the more detailed description that is presented later.

This application concerns a self-organizing, data-driven learning hardware system with local interconnections. The learning hardware system includes a collection of self-organizing interconnected local processors arranged in a learning array. The local processors can be, for example, an artificial neuron ("neuron") that includes a neuronal processor that can be, for example, a reduced instruction set processor (RISP). The system also includes local interconnections that connect subsets of the artificial neurons.

Since the neurons have local computing capability, training processing can be performed substantially in parallel in the neurons. Thus, three elements of learning (e.g., choosing local interconnections as inputs, determining optimum transformations, selecting entropy based thresholds) can be performed locally as the neurons work substantially in parallel. Similarly, run time execution processing can be performed substantially in parallel. With the availability of parallel processing, the complexity of the architecture does not have to be mapped into a single processor and computed in serial, as is typical in conventional systems. The resulting self-organizing array configuration thus facilitates performing artificial neural network like tasks including, but not limited to, pattern recognition, predictions, and modeling unknown systems, for example.

The application also concerns a method for organizing artificial neurons into a data driven learning architecture to facilitate performing artificial neural network tasks. Training data is presented to initially pseudo-randomly interconnected artificial neurons. Based, at least in part, on the training data, neurons locally determine, substantially in parallel, local interconnections as inputs to the neuron. Similarly, based at least in part, on the training data, neurons locally determine a transformation function (e.g., linear, threshold, sigmoidal, exponential, logarithmic, synaptic) to be performed by the neuron. The neurons can also locally determine a threshold value for a transformation function based on the training data. Since the interconnected neurons having local processing ability, it is to be appreciated that these three activities (and others) can be performed substantially in parallel, mitigating computational burdens associated with conventional serial processing systems. Thus, unsupervised learning that facilities reducing subspace entropy is facilitated.

Certain illustrative example methods, systems, and computer readable media are described herein in connection with the following description and the annexed drawings. These examples are indicative, however, of but a few of the various ways in which the principles of the methods, systems, and computer readable media may be employed and thus are intended to be inclusive of equivalents. Other advantages and novel features may become apparent from the following detailed description when considered in conjunction with the drawings.

BRIEF DESCRIPTION OF THE DRAWINGS

Prior art

FIG. 20 illustrates a neuron partitioning a local input space derived from an original input space.

DETAILED DESCRIPTION

Figure 1:
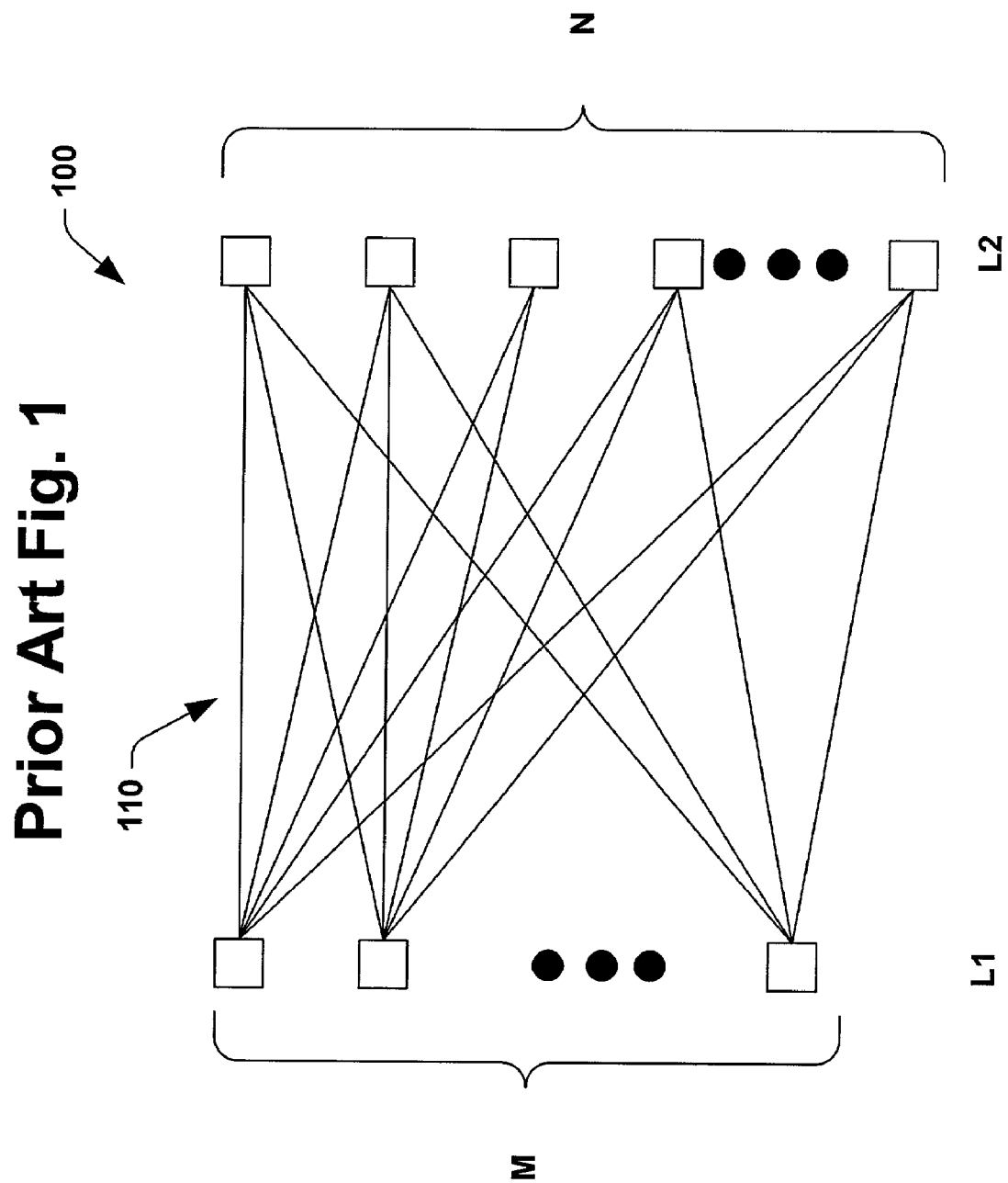
FIG. 1 illustrates a conventional, global interconnection architecture.

Example methods and systems are now described with reference to the drawings, where like reference numerals are used to refer to like elements throughout. In the following description, for purposes of explanation, numerous specific details are set forth in order to facilitate thoroughly understanding the methods and systems. It may be evident, however, that the methods and systems can be practiced without these specific details. In other instances, well-known structures and devices are shown in block diagram form in order to simplify description.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program and a computer. By way of illustration, both an application running on a server and the server can be computer components. One or more computer components can reside within a process and/or thread of execution and a computer component can be localized on one computer and/or distributed between two or more computers.

"Computer communications", as used herein, refers to a communication between two or more computers and can be, for example, a network transfer, a file transfer, an applet transfer, an email, a hypertext transfer protocol (HTTP) message, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Logic", as used herein, includes but is not limited to hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device. Logic may also be fully embodied as software.

"Signal", as used herein, includes but is not limited to one or more electrical or optical signals, analog or digital, one or more computer instructions, a bit or bit stream, or the like.

"Software", as used herein, includes but is not limited to, one or more computer readable and/or executable instructions that cause a computer or other electronic device to perform functions, actions and/or behave in a desired manner. The instructions may be embodied in various forms like routines, algorithms, modules, methods, threads, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel processing computer components and thus can be loaded and/or executed in serial, parallel, massively parallel and other manners.

Conventional neural network architectures may feature globally interconnected layers of processing components where a processing component of one layer of the neural network is connected to all the processing components in another layer. Referring to prior art FIG. 1, a typical global interconnection neural network 100 is illustrated. At a first level L1, M artificial neurons are present. The M neurons of level L1 are each connected by interconnections 110 to N neurons in a second level L2. In this typical global interconnection scheme, a neuron in one layer is connected to all neurons in the next layer and/or a previous layer. This leads to a wire dominated design that can produce concerns about the amount, length, and cost of wiring. If L1 has M elements and L2 has N elements, then there are M×N interconnections between L1 and L2. Adding an element to L1 or L2 quadratically increases the number of interconnections 110 while also linearly increasing the length of a wire run, which leads to an overall cubic increase in the amount of wire required to make the total interconnections 110. This amount of wiring consumes significant chip real estate and limits the size and complexity of conventional total interconnection systems.

Weights applied to interconnections are typically determined by off-line optimization algorithms that employ, for example, a global minimum function. This type of serial processing, where each weight is in turn passed through a single processor, is computationally impractical for large networks. When the entire system 100 is modeled by one processor to facilitate training, and where the simulation employs serial processing of node values and/or interconnect weights, training can be computationally intense resulting in long training times.

Figure 2:
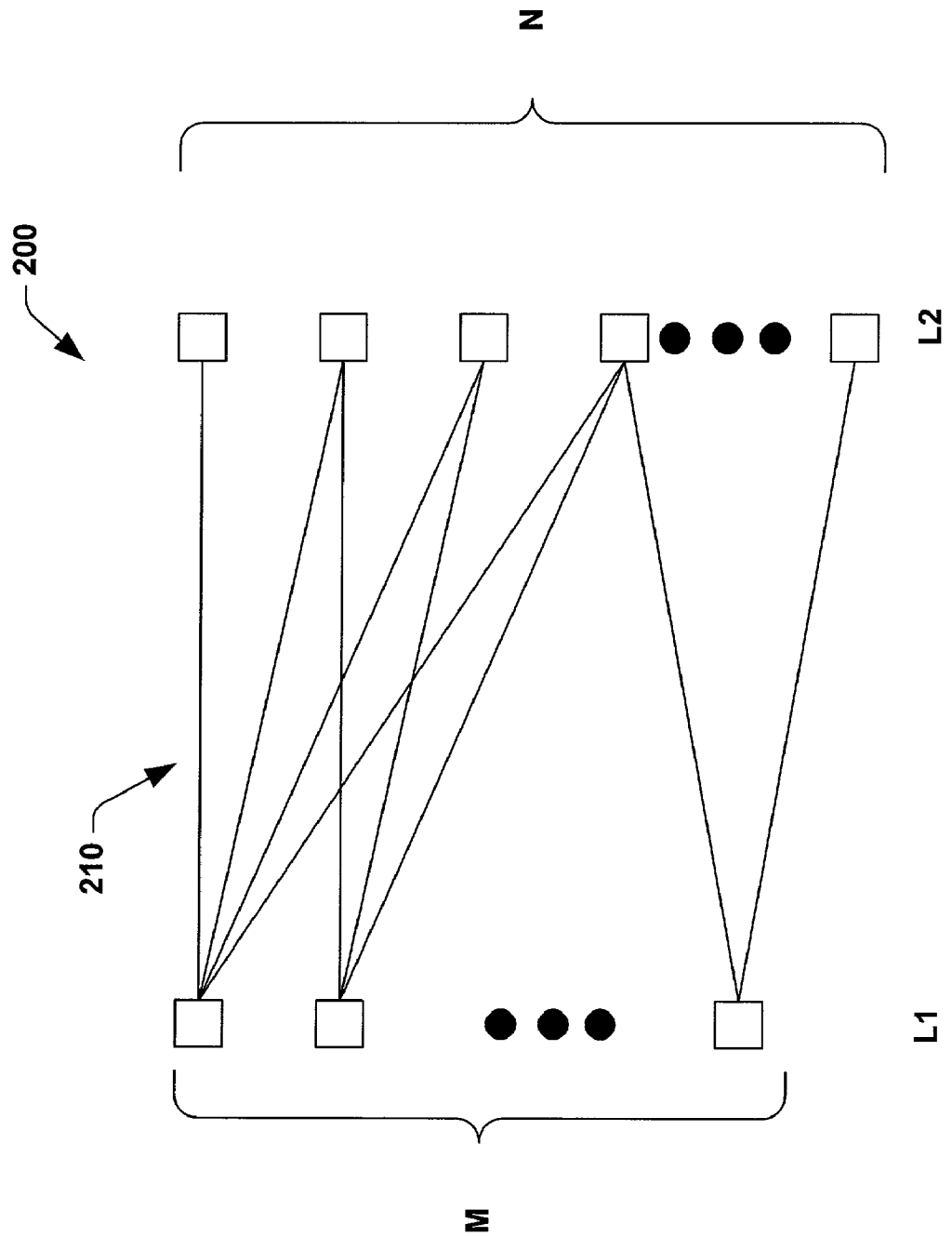
FIG. 2 illustrates an example of a portion of a local interconnection architecture with initial pseudo random interconnections before training.

FIG. 2 illustrates an example of a portion of a local interconnection architecture 200 with initial pseudo random interconnections 210 before training. In architecture 200, the wiring scheme differs from that illustrated in prior art FIG. 1. M neurons are arranged in a first level L1. N neurons are arranged in a second level L2. Less than total interconnection is undertaken through the interconnections 210. Thus, where a conventional architecture would have M×N interconnections there are less than M×N interconnections since each element of L1 is not connected to each element of L2. Neurons in L1 may be connected, for example, to one element in L2, or two or more elements of L2. The number of initial connections is configurable and may be determined in a pseudo random manner. Since the neurons in L1 may be connected to a configurable, pseudo random number of neurons in L2, each neuron in L2 may initially have a variable number of inputs. Again, the number of inputs to a neuron in L2 can be a configurable, pseudo random number of connections.

During training of the architecture 200, the set of local interconnections 210 as inputs can be locally selected by an element (e.g., artificial neuron) so that after training, a neuron in L1 might be connected to less elements than it was originally connected to and a neuron in L2 might have fewer inputs than it originally had. Choosing the local interconnections 210 can be performed by each individual neuron. Thus, a first of three elements of learning can be performed at the local (e.g., neuron) level. Locally choosing local interconnections 210 as inputs in a system where interconnections are initially chosen substantially randomly with a preference for local connections to reduce wiring facilitates having a smaller number of runs between neurons and shorter runs between neurons. In one example, after training, a neuron may end up with one or two inputs, for example, and a threshold-controlled input. The neuron can then employ the threshold-controlled input to select between available input data lines.

Locally choosing local interconnections 210 mitigates problems associated with the wire dominated design of conventional systems. Reducing the amount of wiring by reducing the number of interconnections and favoring local connections facilitates producing a deep, multi-level structure with a larger number of processing components than is conventionally computationally and/or chip real estate feasible. Adding a new element to L2 adds the configurable, pseudo random predefined number of runs between L1 and L2, rather than adding a run for each element in L1. Since local interconnections are favored, the length of the runs does not increase as dramatically as in conventional systems.

Figure 3:
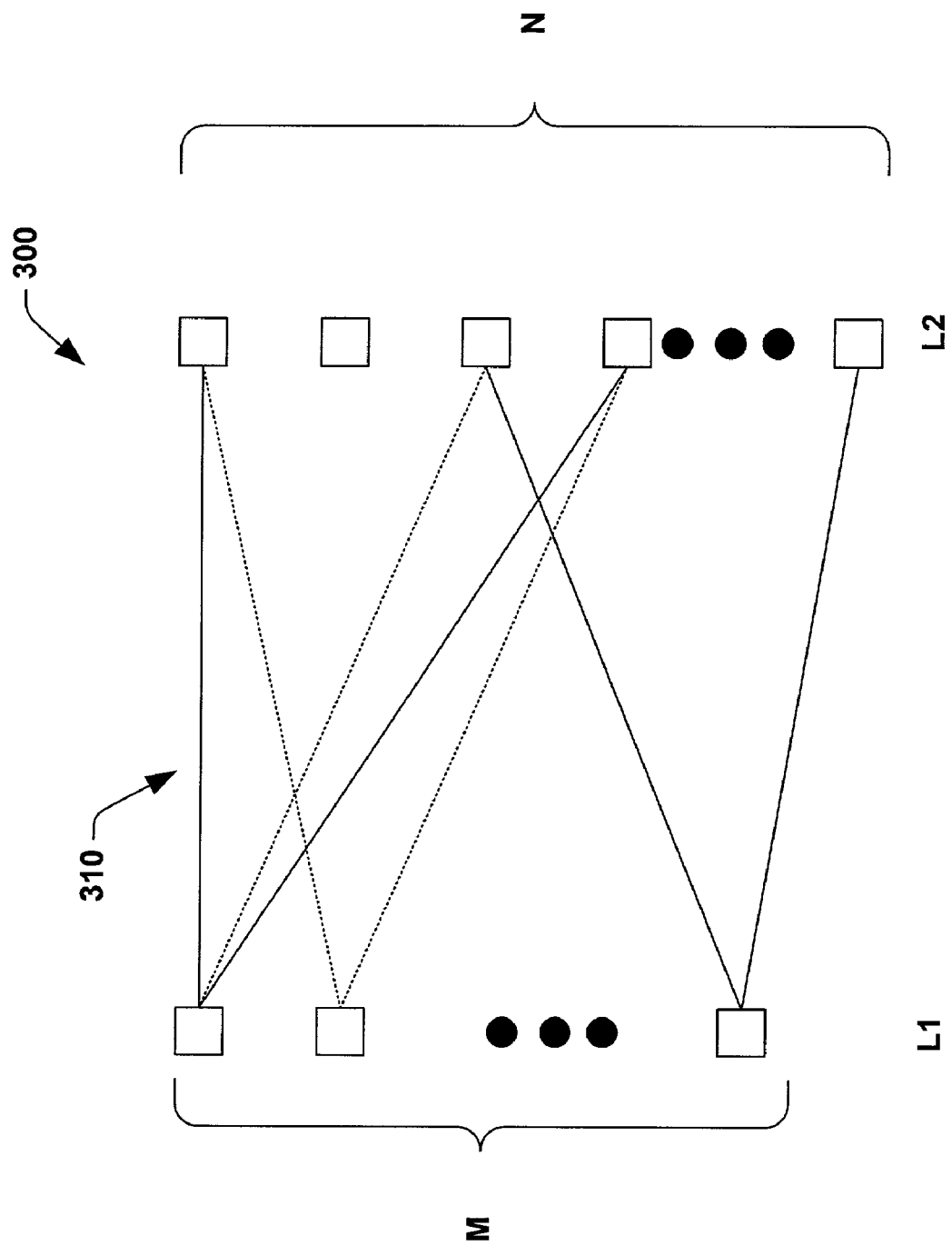
FIG. 3 illustrates an example of a portion of a local interconnection architecture with locally selected interconnections after training.

FIG. 3 illustrates an example of a portion of a local interconnection architecture 300 with locally selected interconnections 310 after training. After training, an element (e.g., neuron) in L2 might have, for example, one or two data inputs (represented as solid lines) and a threshold-controlled input (represented as a dotted line). Some elements in L2 might even be unconnected because their input space may not convey sufficient information to contribute to classification and/or reducing input space entropy. These neurons would be available for other tasks and/or could be removed from a production design.

The newly wired architecture, along with functions performed locally at the neurons, facilitate producing a parallel processing device that is data driven and which performs intelligent tasks without being programmed. The self-organizing learning array 300 is trained substantially in parallel. In conventional systems, training involves serially processing weights for each connection. The self-organizing learning array 300 is trained by having neurons locally select interconnections, transformation functions for a neuron, and entropy thresholds for a neuron.

A neuron may be switched to a different task than that to which it was originally assigned in a multi-tasking architecture. For example, after training, a neuron may not be connected and thus may be available. Or, a neuron might contribute little, if anything, to partitioning an input space. Thus, it can be removed from the architecture tasked with partitioning that input space without significant effects. This facilitates producing a general-purpose architecture that can be trained for more than one problem space. For example, architecture 300 may be trained to perform face recognition and voice recognition and then to create associations between the face recognition and the voice recognition. Assume two learning paths for the two tasks. In a first task, a neuron may significantly contribute to the task and thus be retained for the run time execution of the task. Another neuron may not significantly contribute to the task, or may even be unconnected in that task. Thus, this neuron can be released from the first task, recruited for the second task and employed in training up the architecture for the second task. Thus, in one example, a method for organizing artificial neurons to facilitate artificial neural network tasks includes pseudo randomly connecting a set of artificial neurons and then receiving a training data to train up the set of artificial neurons. Training up the array of artificial neurons to facilitate organizing the artificial neurons includes locally determining, substantially in parallel, local interconnections between neurons. Training up the network can also include locally determining a transformation function for a neuron and an entropy based threshold for a neuron. Locally determining the local interconnections, the transformation function, and the entropy-based threshold can be based, at least in part, on the training data.

The architecture 300 can be employed in a data driven learning hardware system that includes a number of self-organizing processors arranged in a learning array and a number of interconnections that connect subsets of the self-organizing processors. In one example, a self-organizing processor is programmable to selectively perform a transformation function on a data input and to produce a data output and/or a threshold-controlled output. The processor selectively performs the transformation function based, at least in part, on the data inputs. The transformation function can be, for example, a linear function, a threshold function, a sigmoidal function, an exponential function, a logarithmic function, and a synaptic function. During training, self-organizing processors can be programmed to locally select a transformation function that the processor will perform during execution. Similarly, a self-organizing processor can be programmed to locally select a subset of the initial pseudo random local interconnections to retain and a subset of the local interconnections to release. Thus, with the neurons having a local ability to select interconnections, transformation functions, and entropy based thresholds, the training of the architecture 300 can be performed substantially in parallel. A self-organizing processor can also be programmed to locally select an entropy-based threshold to store in a memory in the processor.

Figure 4:
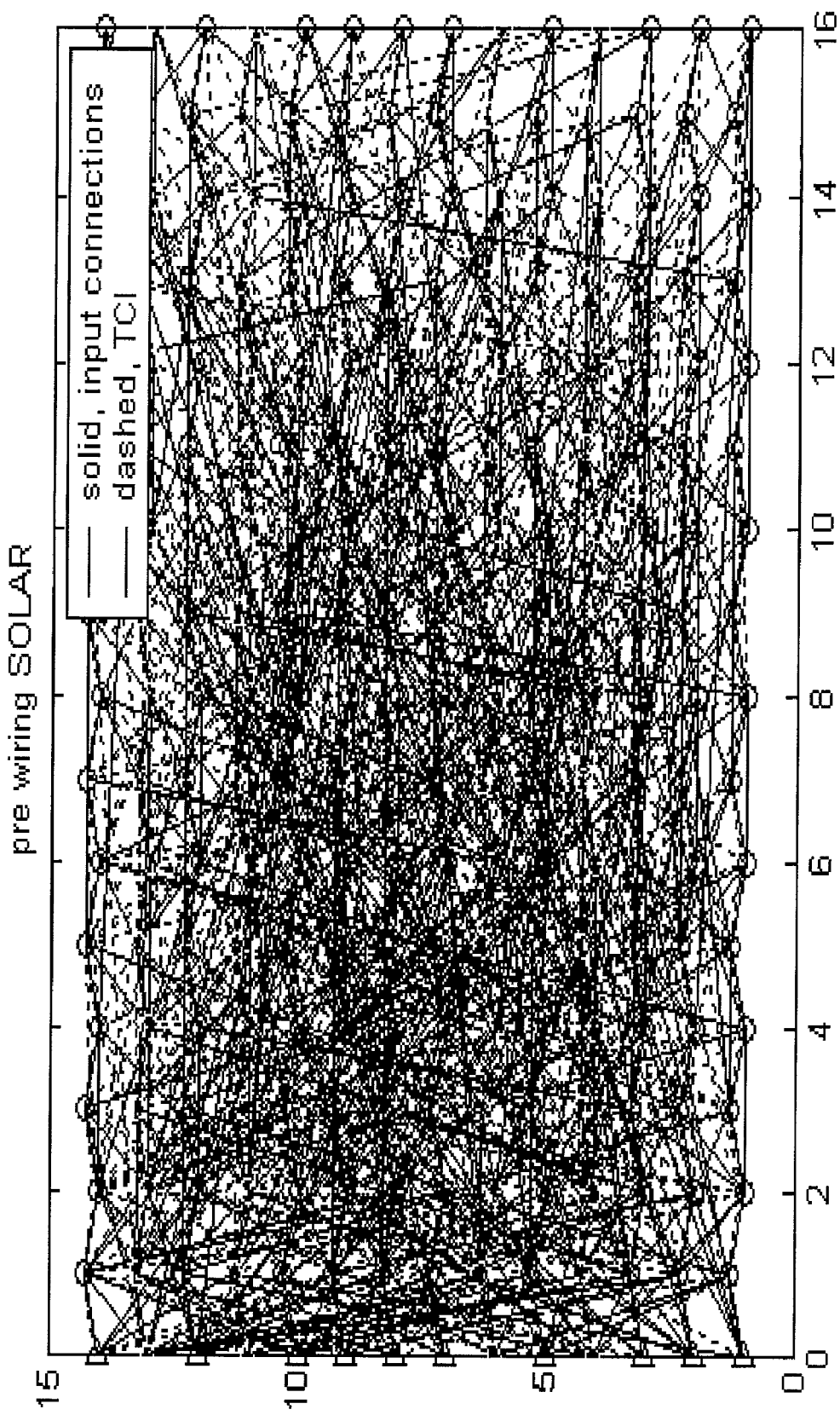
FIG. 4 illustrates an example implementation of a local interconnection architecture with initial pseudo random interconnections before training.

FIG. 4 illustrates an example implementation of a local interconnection architecture 400 with initial pseudo random interconnections before training. The architecture 400 includes initial input connections represented with solid lines and initial threshold-controlled inputs represented with dotted lines. As can be seen, the initial pseudo random connections are very densely arranged as compared to the more sparse connections illustrated in FIG. 5.

Figure 5:
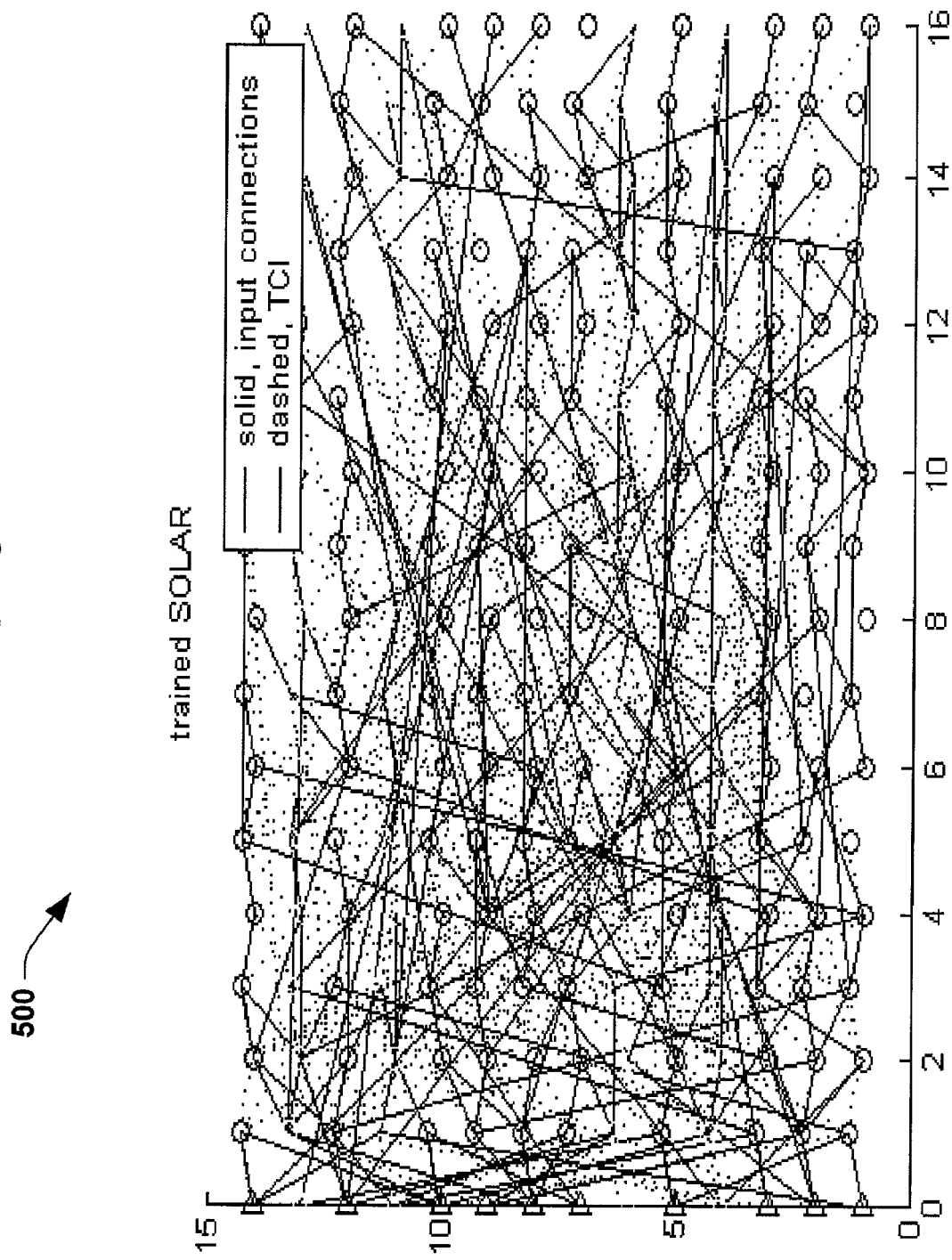
FIG. 5 illustrates an example implementation of a local interconnection architecture with locally selected interconnections after training.

FIG. 5 illustrates an example implementation of a local interconnection architecture 500 with locally selected interconnections after training up the architecture illustrated in FIG. 4. Again, the input connections to a neuron are presented with solid lines and the threshold-controlled inputs to a neuron are represented with dashed lines. The more sparse wiring illustrated in FIG. 5 facilitates mitigating wire related problems associated with conventional systems. In one example, the pre-wired architecture 400 receives a training data and then the neurons locally determine, substantially in parallel, which local interconnections to retain between the artificial neurons, which transformation function will be performed at connected neurons, and an entropy based threshold for a neuron. These determinations are based, at least in part, on the training data. A local interconnection may convey into an artificial neuron a data input, a threshold-controlled input, and an input information deficiency. Similarly, a local interconnection may convey out of an artificial neuron a data output, a threshold-controlled output, and an output information deficiency. The transformation functions between which a neuron may locally select include, but are not limited to, a linear function, a threshold function, an exponential function, a sigmoidal function, a logarithmic function, and a synaptic function.

Neurons in a learning array are initially pseudo randomly connected to previously generated neurons in the pre-wiring stage. The training procedure refines the initial structure. To facilitate neurons learning from other neurons' subspaces, it is efficient to locally connect neurons with their neighbors during training. Thus, one example connection strategy includes a high probability of connecting previously generated close neighbors of neurons. Closer connections require less wiring and facilitate preserving local features. In one example, the Manhattan distance can be employed as a metric of neighborhood. Self organization of the self-organizing learning array system results in selecting connections between neurons from the initial pre-wired structure, substantially in parallel. A configurable number of data inputs and a threshold-controlled input connection are, in one example, reserved for each neuron in the optimized selection period. In one example, a self-organizing learning array is implemented in a field programmable gate array (FPGA) chip. In constructing the array, the architecture of the programmable unit in the FPGA is considered. To implement neural operations, storage components like flip flops and latches are employed. According to the architecture of a look-up table in a XILINX FPGA chip, a look-up table can be employed as one 16×1 RAM memory.

Figure 6:
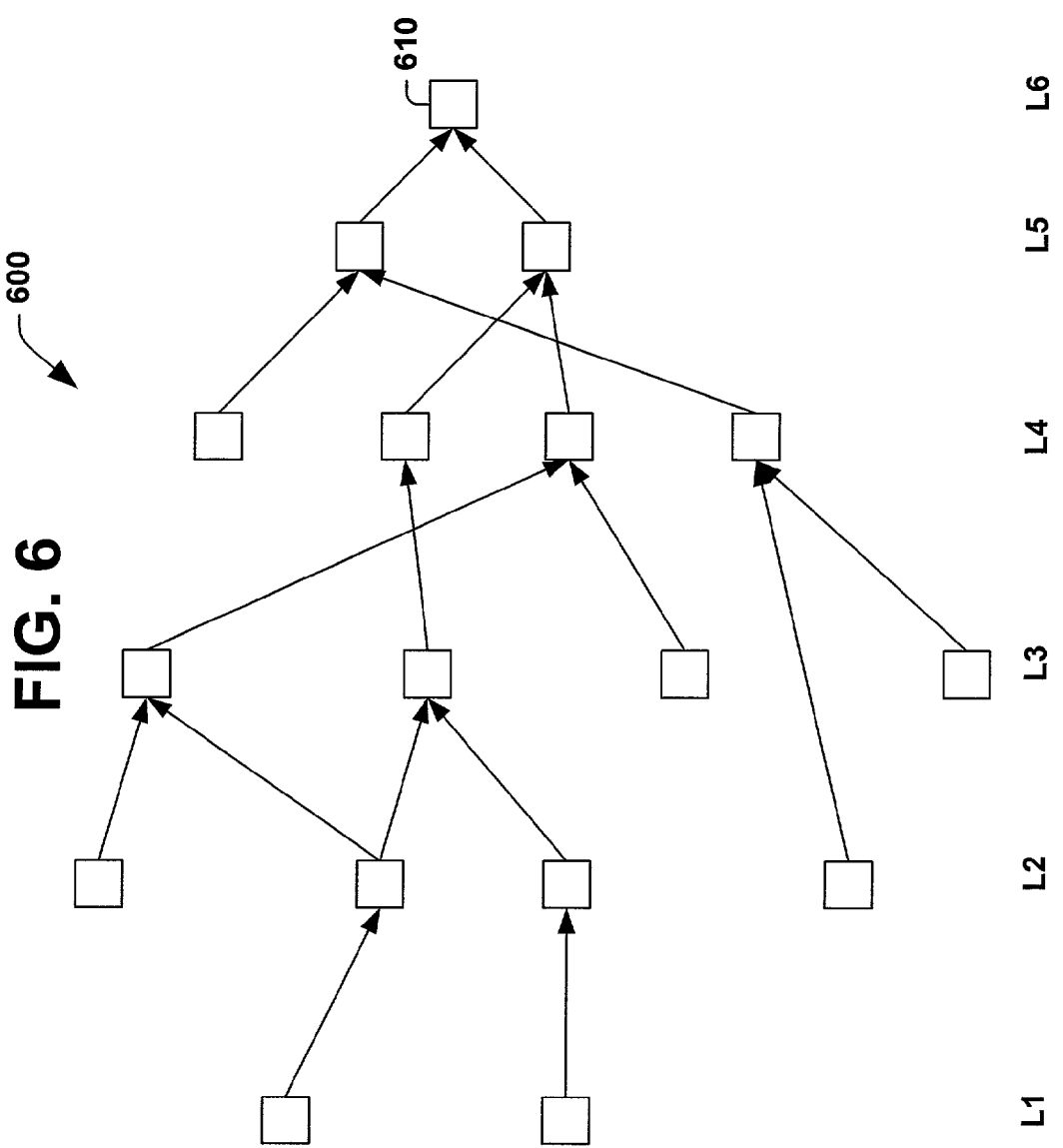
FIG. 6 illustrates an example of an associated neuron.

Turning now to FIG. 6, an associating neuron 610 in a self-organizing learning array 600 is illustrated. The self-organizing learning array 600 with six layers L1-L6 represents a fragment of a bigger network that is related to a single associating neuron. Neurons in previous layers feed forward data and/or threshold-controlled inputs to neurons in subsequent levels. As the input space is partitioned by the neurons at the different levels, eventually an association can be made. In the self-organizing learning array 600, the neuron 610 has "coded for" a pattern presented to the inputs of the self-organizing learning array 600. FIG. 6 illustrates that the "output" neuron is not pre-wired in the architecture 600. In conventional systems, connections and/or weights are manipulated to force an architecture to produce an output at an output node. In the self-organizing learning array 600, the "output node" is not predetermined. The association node 610 becomes the de facto output node through the local determinations of interconnections, transformation functions, and threshold values. The output of the associating neuron can represent a local feature or more complex and abstract idea depending on the association made by the neuron.

Self-organizing neural networks like that illustrated in FIG. 6 learn by association. Activities of neurons can be determined by the information index of information presented to a neuron. Similarly, the function of a neuron can be determined by the information index of data presented to the neuron. The associating neuron 610 receives information from its "dendrite tree" and one or more artificial synapses. An artificial synapse transmits the signal it received as an input as its output without making a transformation. Determining an information index is discussed in greater detail in connection with FIGS. 8, 19 and 20.

During training of the network 600 it may be beneficial to observe the type and/or number of associations being made. Simple partitions of the input space and simple associations may form at the early levels of the architecture 600 (e.g., L1, L2) with more sophisticated and/or complex associations forming in later levels of the architecture 600 (e.g., L5, L6). During training, examining the connections and activity at a neuron facilitates identifying neurons that are progressing towards an associating neuron state.

Figure 7:
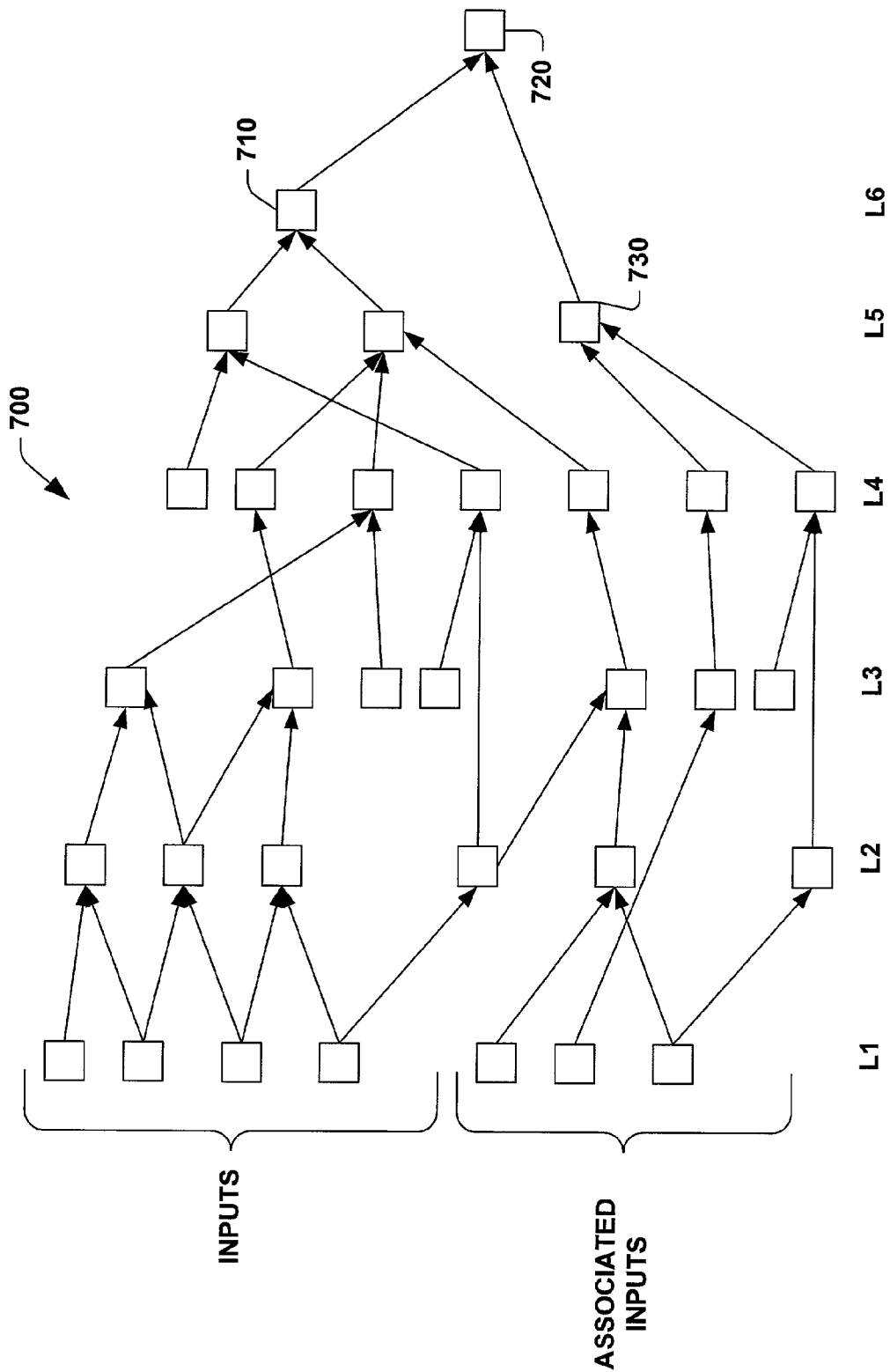
FIG. 7 illustrates an example neuron making an association between inputs.

Turning now to FIG. 7, an example neuron 720 making an association between inputs is illustrated. Assume that neuron 710 "coded for" an input pattern. For example, data associated with an apple is recognized by neuron 710. Associated inputs (e.g., apple orchard, smell of an apple, taste of an apple, William Tell) may also be presented to the network 700. Neurons may code for these individual concepts. Then, an associating neuron 720 may make an association between the apple neuron 710 and a neuron 730 that codes for one of the associated inputs. In this way, deep, complex neurons can evolve by combining associations produced by combining inputs from other processing components.

Figure 8:
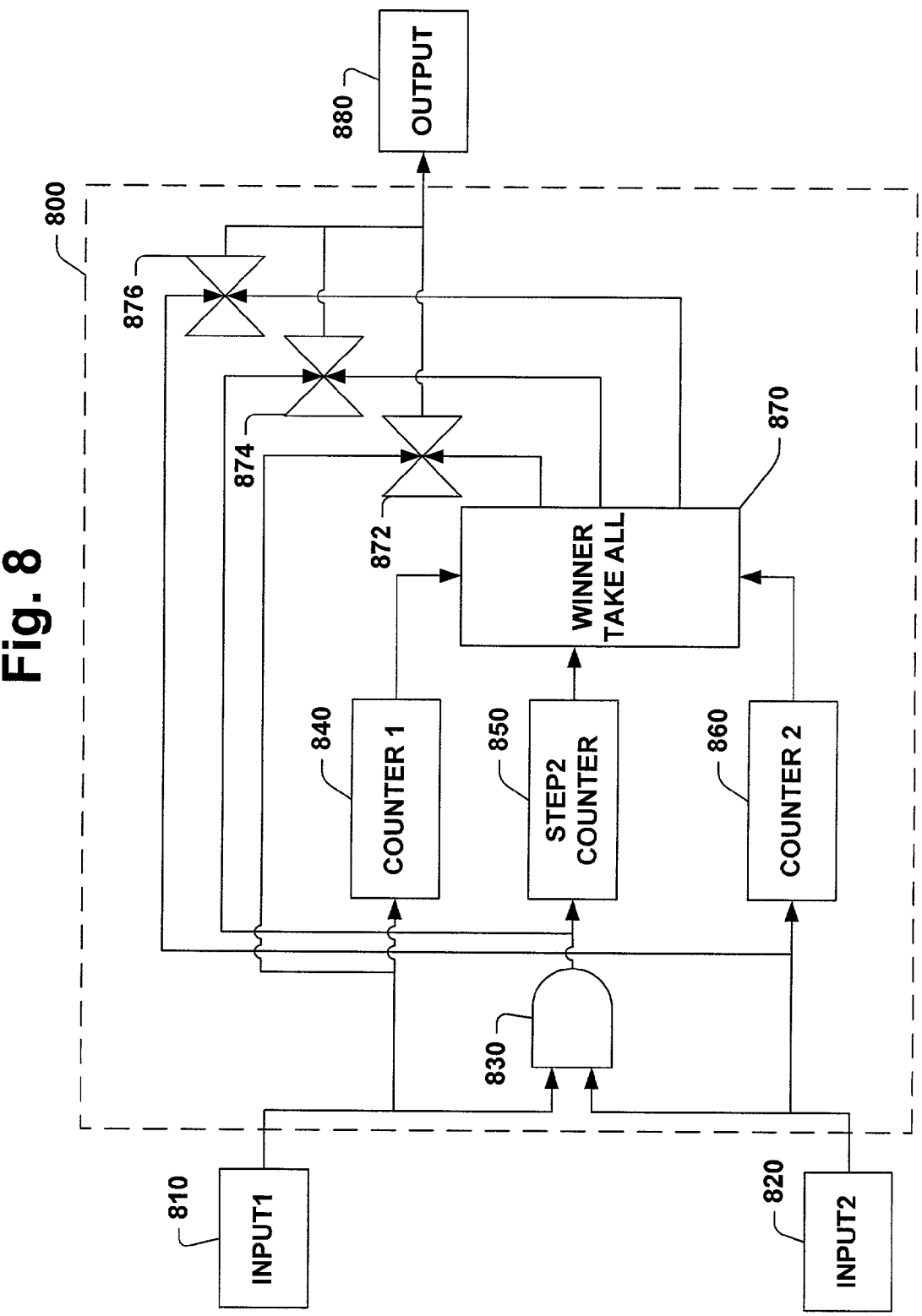
FIG. 8 is a block diagram of example neuron inputs.

FIG. 8 is a block diagram of a portion of an example associating neuron 800. A neuron can become a "transmitting component" if there is insufficient information on its inputs to contribute to partitioning an input space. In such a case, the neuron may perform a selective pass-through or synaptic function rather than a transformation function. One example neuron employs a winner take all strategy where the logic implementing the winner take all is implemented at 870. A first input 810, a second input 820, and the logical AND 830 of the two inputs are presented to the neuron 800. The neuron 800 selects either one of the neuron inputs and transmits it to its output or selects the result of the neuron processing (e.g. AND), and passes its value to the neuron output. In case one of the inputs is selected, the neuron 800 acts as a transmitter rather than a processing element. An associating neuron can transmit its output to one of its inactive inputs, thereby facilitating association. The number of times the inputs have been presented can be stored in counters like counter1 840, a step2 counter 850, and counter2 860. The inputs and the result of the winner take all logic 870 can be combined by elements 872, 874, and/or 876 and then selectively provided as output 880.

In one example, during learning, a neuron first counts the total training data $n_t$ received. Similar to other sequential machines, neurons perform an operation on the selected inputs (or single input) at the rising edge of the system clock.

If the threshold-controlled input (TCI) associated with a particular input data is high, the result of the operation is compared against a set of threshold values. This facilitates determining whether input data is within the subspace a neuron is learning. If TCI is zero, no comparison occurs since this particular input data is outside of the range of the subspace where the neuron is learning. In one example, a neuron counter can be controlled by its TCI and analysis associated with three sets of numbers:

1. Amount of data that satisfies the threshold value: $n_s$
2. Amount of data belonging to a class that satisfies the threshold value: $n_{sc}$
3. Amount of data belonging to a class that does not satisfy the threshold value: $n_{sic}$ This facilitates a threshold value dividing the input space into two subspaces. The quality of learning of each neuron can be calculated statistically by computing an information index. In order to calculate an information index, finding the probabilities of training data that falls in a subspace is beneficial. The following probabilities are employed in calculating an information index.

1. Probability of a class satisfying threshold:

$$P_{sc} = \frac{n_{sc}}{n_t}$$

2. Probability of a class not satisfying threshold:

$$P_{sic} = \frac{n_{sic}}{n_t}$$

3. Subspace probability (pass threshold):

$$P_s = \frac{n_s}{n_t}$$

4. Subspace probability (not pass threshold): $P_{si}=1-P_s$
5. Class probability—

$$P_c = \frac{n_c}{n_t}$$

With these calculated probabilities, an information index can be obtained as follow:

$$I = 1 - \frac{\Delta E_s}{E\max}$$
$$= 1 - \frac{\left[\sum_{sc} P_{sc}\log(P_{sc}) - P_s\log(P_s)\right] + \left[\sum_{sic} P_{sic}\log(P_{sic}) - P_{si}\log(P_{si})\right]}{\sum_c P_c\log(P_c)}$$

Different combinations of inputs, transformation operations, and TCIs can result in different information index values. Neurons perform information index calculations for different combinations, and the maximized result is obtained in order to provide an optimum separation of the input training data. When the index value becomes "1", it indicates that the neuron has solved its problem completely.

Different transformation functions can result in different information index values. Having the same inputs and TCI, multiplication operations on inputs can produce a higher information index than using addition. If the value remains the highest among combinations, multiplication, then, is selected by a neuron as its transformation function. The inputs and threshold value are also stored. Threshold values are selected where the maximized information index value is located. It is used to scale the chosen transformation function to separate the input space.

Figure 9:
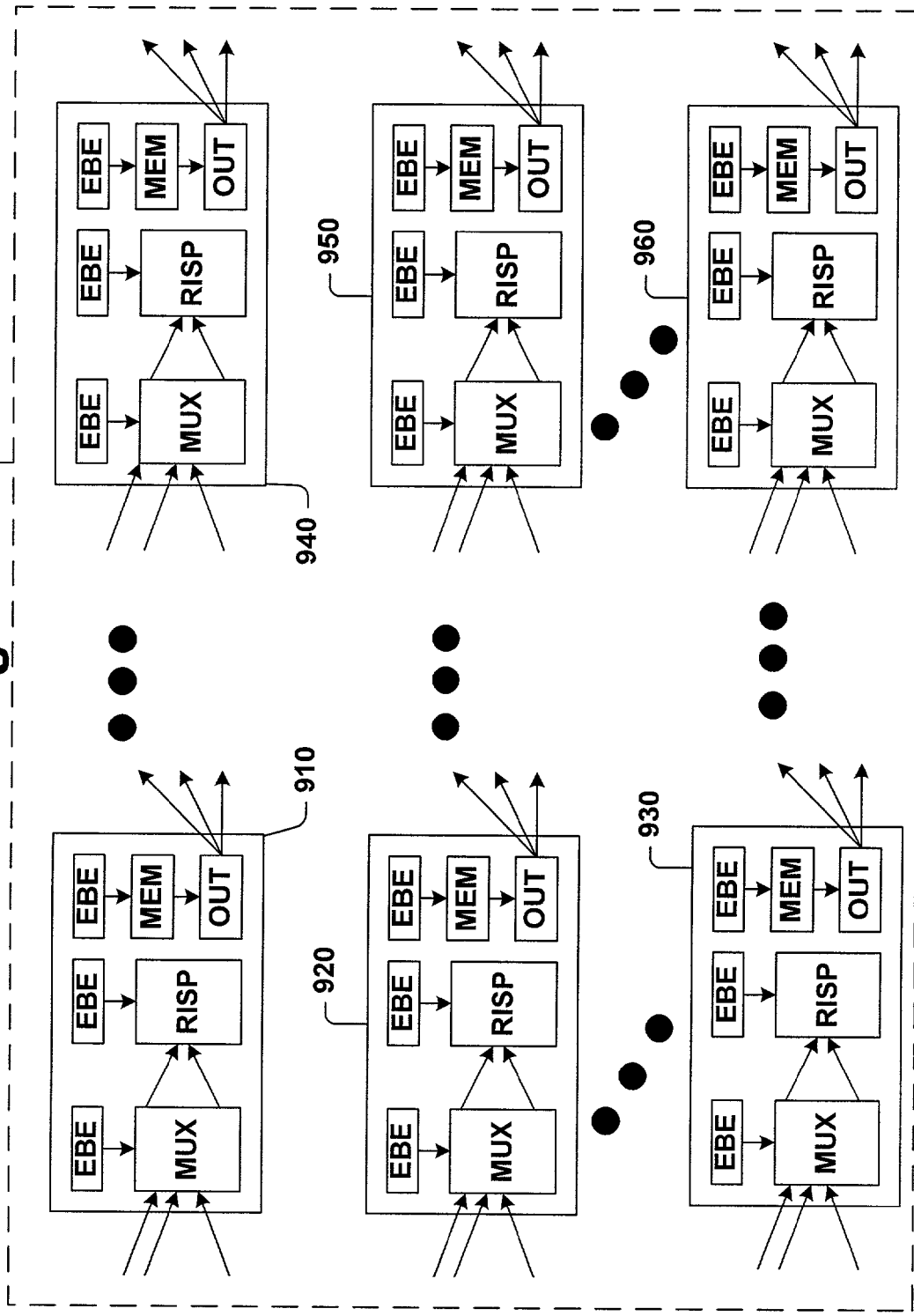
FIG. 9 illustrates an example organization of a self-organizing learning array.

FIG. 9 illustrates an example organization of a self-organizing machine 900. The machine 900 can be a data driven learning hardware system that includes a number of self-organizing processors (e.g., 910, 920, 930, 940, 950, 960) and a number of local interconnections that connect the self-organizing processors. A self-organizing processor 910 can also be referred to as a neuron. The self-organizing processor 910 can include a neuronal processor that facilitates partitioning an input data space. The self-organizing processor 910 may also include an entropy based evaluator (EBE) that facilitates determining the entropy in the input data space that the processor will partition. Furthermore, the self-organizing processor 910 can include a memory that stores values that can be accessed by the neuronal processor and/or the entropy based evaluator. In one example, the neuronal processor is a reduced instruction set processor (RISP). In another example, the self-organizing processor includes a first multiplexor that facilitates selecting between data inputs that will be provided to the neuronal processor and/or the EBE. The self-organizing processor can also include a second multiplexor that facilitates selecting between two or more threshold-controlled inputs to be provided to the processor and/or the entropy based evaluator where the threshold-controlled inputs facilitate selectively controlling the operation of the processor and/or entropy based evaluator.

Training data is presented to the self-organizing learning array 900 as feature vectors. Assume that M input data points used for training are described by N-dimensional vectors. So the neural network 900 has N inputs and reads the information in parallel from N input feature vectors.

The example neural network 900 illustrated in FIG. 9 is a feed forward structure that decides about interconnections and neuron operations at the local self-organizing processor level. The neural network 900 has a pre-wired organization that contains a number of processing blocks (e.g., neurons) that are pseudo-randomly connected to the input nodes and other neurons. In addition, the illustrated neurons have an entropy based evaluator for selecting a reduced instruction set processor operation and input for the neuron.

The architecture illustrated in FIG. 9 can be employed in both feed forward and feed backward organizations. The feed forward organization is constructed under the assumption that the inputs of newly generated neurons are connected to existing neuron outputs or the primary inputs. The neurons can be generated, for example, sequentially and/or in groups. As new neurons are added, the number of existing neurons increases and the increased number of outputs can be used as inputs in subsequently generated new neurons. In this organization neurons generated later in the process do not feed neurons generated earlier.

In a feed backward organization neurons are generated concurrently. Inputs of neurons can be connected to outputs of other neurons including themselves. A feed backward organization may become unstable in the case where a positive feedback causes an increase in the input signal values. Therefore, care should be taken to limit the type of arithmetic operations performed on the input data. The transformation performed on the input data should be contractive, which means that the norm of the output of a neuron is less than or equal to the average norm of the inputs.

In one example, linear transformations may be evolved by repetitively applying the Haar wavelet. Since the two basic operations in a Haar wavelet are averaging and difference of inputs, a linear arithmetic section in the learning hardware can evolve by using an adder/subtractor with right shift. Neurons can be programmed to either perform addition or subtraction, and the right shift of the result, which is equivalent to division by 2 facilitates achieving stability in feedback organizations. A reduced instruction set processor can perform linear and/or selected non-linear or logic operations on its inputs.

Figure 10:
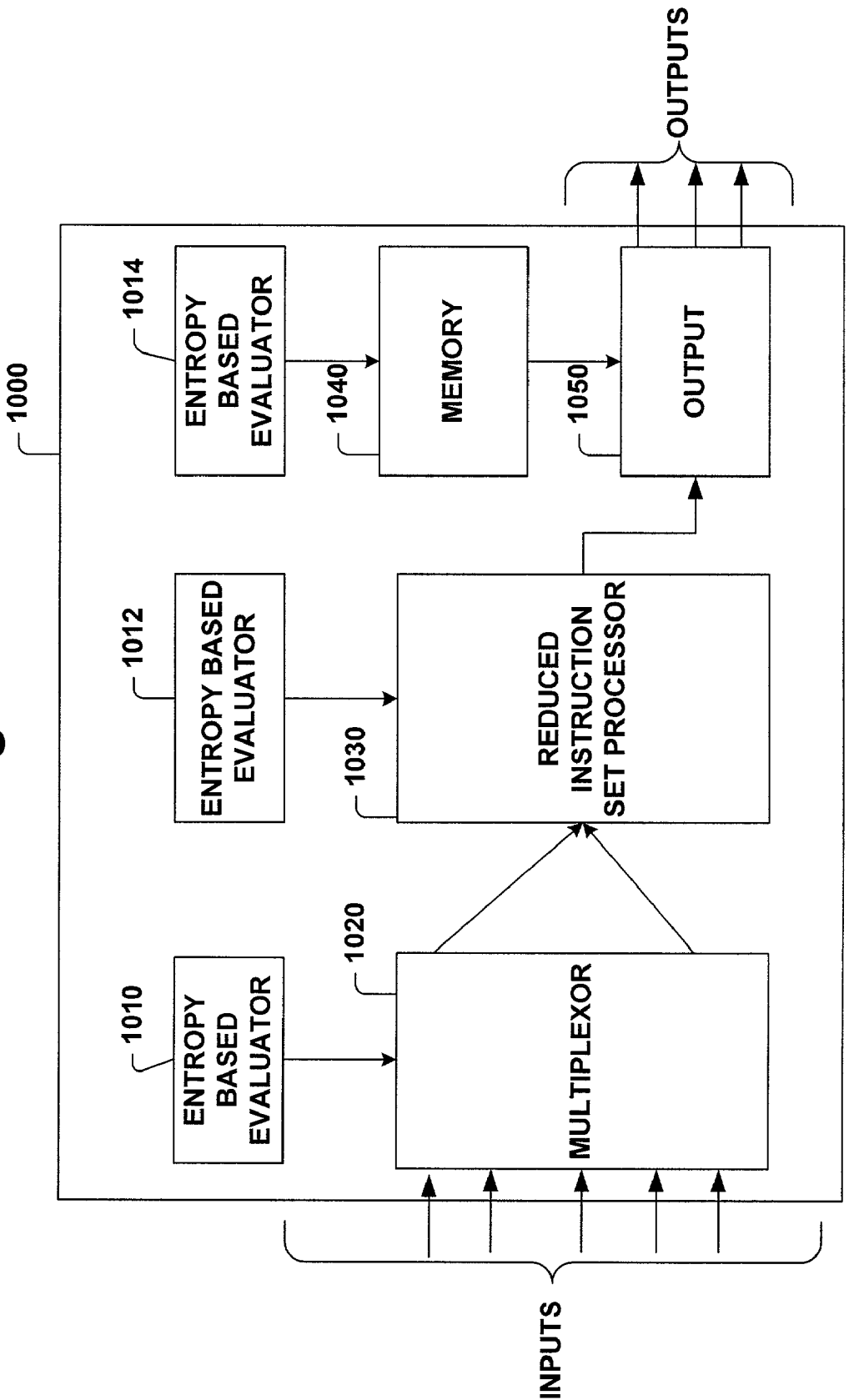
FIG. 10 illustrates an example neuron.

FIG. 10 illustrates an example neuron 1000. Neuron 1000 includes a first multiplexor 1020 that facilitates selecting between inputs that are provided to a reduced instruction set processor 1030. Neuron 1000 also includes entropy based evaluators 1010, 1012 and 1014 that facilitate selectively controlling the operation of the multiplexor 1020, the reduced instruction set processor 1030, and/or a memory 1040 respectively. The neuron 1000 can accept the inputs from input nodes, other neurons, and/or the neuron 1000 itself. Not every neuron will necessarily have the seven components illustrated in FIG. 10. For example, a neuron may function in a synapse role performing no transformation and thus may not include a reduced instruction set processor 1030 and entropy based evaluator 1012.

In one example, a neuron can be clock controlled. At a clock cycle, assume that a different data point is transmitted through the network. In addition, a threshold-controlled input (TCI) is used to control neuronal operation. The neuron's threshold-controlled input is obtained by multiplexing the threshold-controlled outputs (TCO) of the subspace control feeding neurons. There are a configurable number (e.g., three) threshold-controlled outputs of a neuron, which can be determined as follows:

1. TCO=the TCI of the neuron
2. TCOT=the TCI and the neuron threshold output
3. TCOTI=the TCI and the inverted neuron threshold output One of these outputs can be randomly selected as a threshold-controlled input of a new neuron. A neuron's threshold output T can be defined together with the operation of a neuron. A neuron may have a configurable number (e.g., five) signal inputs and a configurable number (e.g., two) threshold-controlled inputs. A signal input to a neuron contains a bus with the binary signal information. A TCI input uses one line for the threshold-controlled output (TCO, TCOT, TCOTI) of the subspace control feeding neurons (SCFN) to transfer related output information deficiency of the SCFN.

Figure 11:
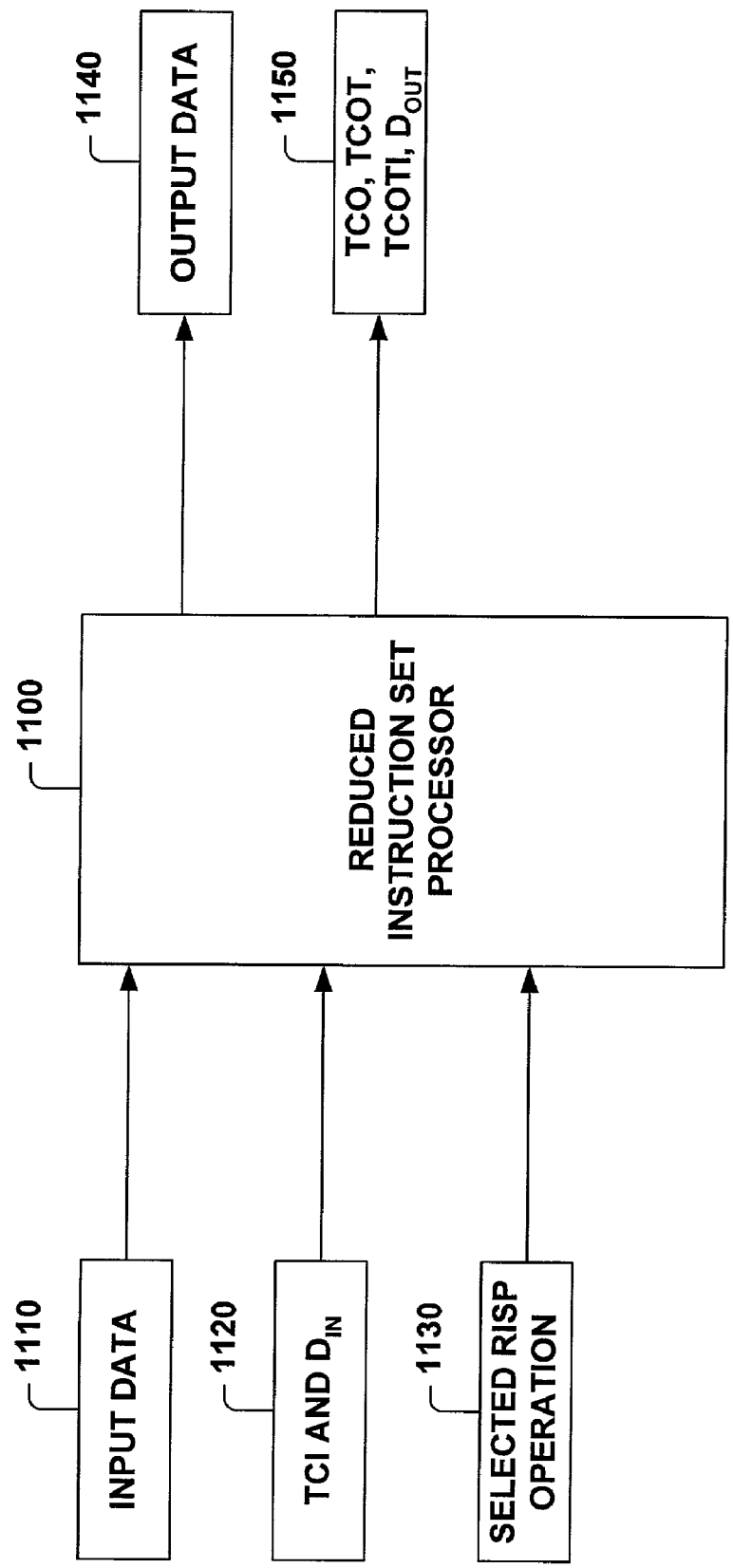
FIG. 11 illustrates an example RISP portion of a neuron.

FIG. 11 illustrates an example reduced instruction set processor 1100 portion of a neuron. The reduced instruction set processor 1100 can be, for example, the neuronal processor in the artificial neuron. The reduced instruction set processor 1100 receives inputs including an input data 1110, a threshold-controlled input and information deficiency 1120, and a selected reduced instruction set processor operation value 1130. The reduced instruction set processor 1100 produces an output data 1140 and one or more threshold-controlled outputs and an information deficiency output 1150. In one example, a reduced instruction set processor 1100 selectively performs a transformation function on the input data 1110 based on the information deficiency input and the threshold-controlled input 1120.

A neuron processes input data by performing a selected operation. The possible operations should be simple enough to have a small design area and a short processing time, yet complex enough to perform a variety of linear and nonlinear arithmetic and logic operations. The processor that performs these operations can be, for example, a reduced instruction set processor (RISP). The RISP can have a controller to select one of its operations to perform on the input data. In one example, average and subtract operations can generate linear transformations. To include nonlinear operations like logarithm and square root, assume that operations are performed on nonnegative integers and produce results that are nonnegative integers. In addition, assume that the result of an operation can be scaled to a full range of integer numbers represented by the bit size of a signal. In one example, the set of operations performed by the RISP includes, but is not limited to, add, sub, mult, divd, root, invr, sqre, log2, and exp2. While nine operations are identified above, it is to be appreciated that a RISP can have a greater and/or lesser number of available operations.

When a neuron processes input data, the input data information index is used to predict a reduction in the subspace entropy. The reduction will occur if the subspace is divided using the selected threshold, which is accomplished by selecting the TCOT or TCOTI to drive the TCI of another neuron or the system output. If TCO is selected as the next neuron TCI, then no subspace division occurs, there is no change in the estimated space entropy, and the neuron's role is to better organize the input data.

In general, several neurons may need to act on an input data in a given subspace to organize it in a way that facilitates classification before the space is divided. The rate of selecting TCO over TCOT or TCOTI can vary to facilitate processing subspace data before a subspace is divided. The rate can be adjusted by the results of analyzing different sets of neural network learning problems. A statistical parameter $p_{ss}$ (probability of subspace selection) that is the probability of selecting either TCOT or TCOTI as the current neuron TCI can be computed. Since the probability of selecting the TCI equals one, we see $p+2* p_{ss}=1$, where p is the TCO probability. It is likely that $p>p_{ss}$ and therefore $p_{ss}<0.33$.

Figure 12:
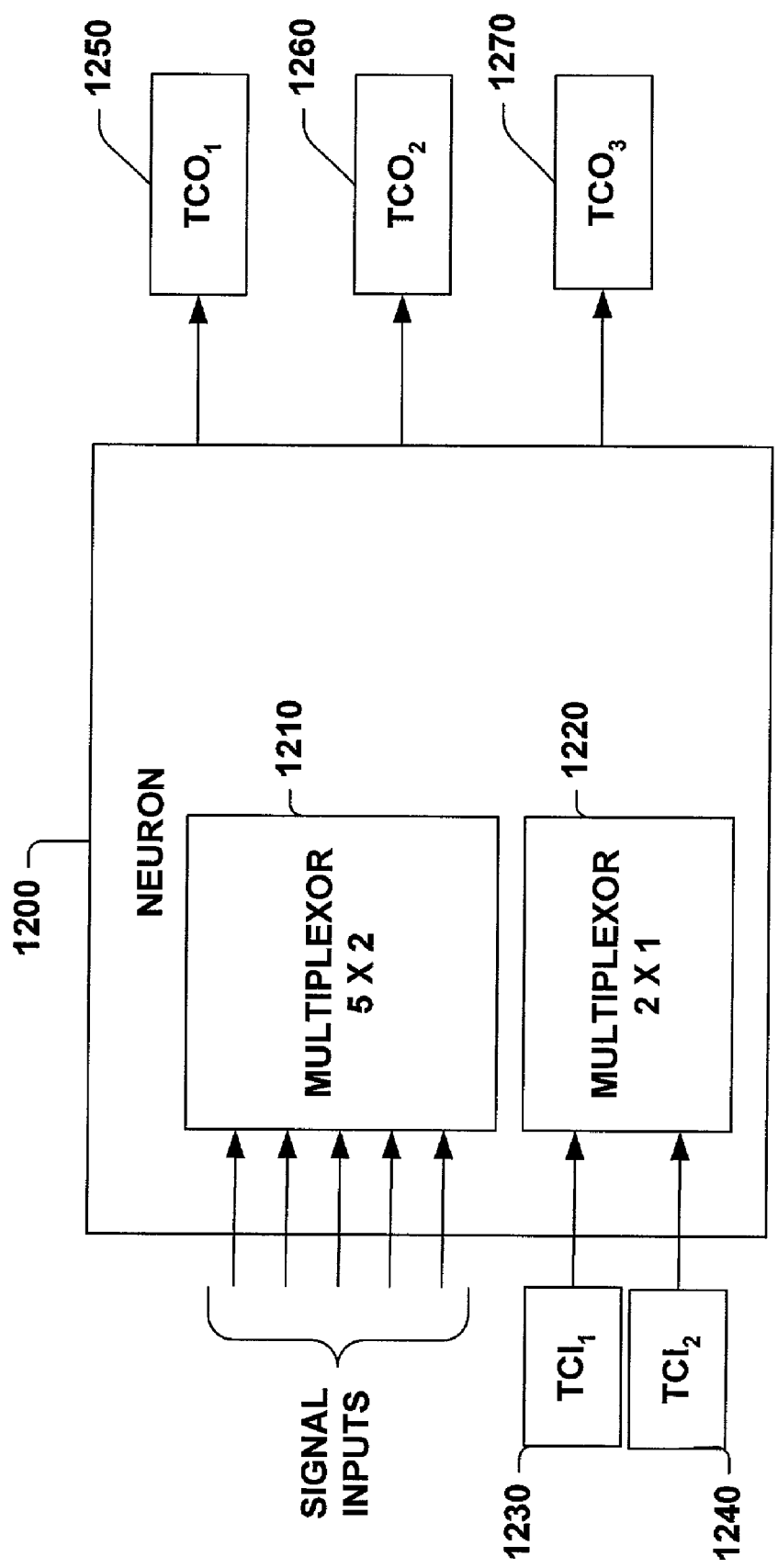
FIG. 12 illustrates example neuronal inputs and outputs.

FIG. 12 illustrates example neuronal inputs and outputs. A neuron 1200 includes a first multiplexor 1210 that facilitates selecting between a number of signal inputs. In FIG. 12, multiplexor 1210 is a 5×2 multiplexor that facilitates selecting two inputs from five available inputs. While multiplexor 1210 is shown as a 5×2 multiplexor, it is to be appreciated that multiplexors of various configurations can be employed in accordance with aspects of the systems and methods described herein. Furthermore, while neuron 1200 is illustrated receiving 5 signal inputs it is to be appreciated that a neuron can receive a greater and/or lessor number of signal inputs.

Neuron 1200 also includes a second multiplexor 1220 that is a 2×1 multiplexor. Multiplexor 1220 facilitates selecting between a first threshold-controlled input 1230 and a second threshold-controlled input 1240. Again, it is to be appreciated that the multiplexor 1220 can have various configurations and that a greater and/or lessor number of threshold-controlled inputs can be provided to neuron 1200. The threshold-controlled inputs can, in one example, be obtained by multiplexing threshold-controlled outputs of subspace control feeding neurons. The neuron 1200 produces a first threshold-controlled output 1250 which may be, for example, the selected threshold-controlled input. The neuron 1200 also produces a second threshold-controlled output 1260 which may be, for example, the selected threshold-controlled input logically ANDED with the threshold value produced by the neuron 1200. The neuron 1200 may also produce a third threshold-controlled output 1270 that may be, for example, the logical AND of the inverse of the selected threshold-controlled input and the threshold value produced by neuron 1200. While three threshold-controlled outputs are illustrated it is to be appreciated that a greater and/or lesser number of threshold-controlled outputs that convey various information can be employed with neuron 1200.

Figure 13:
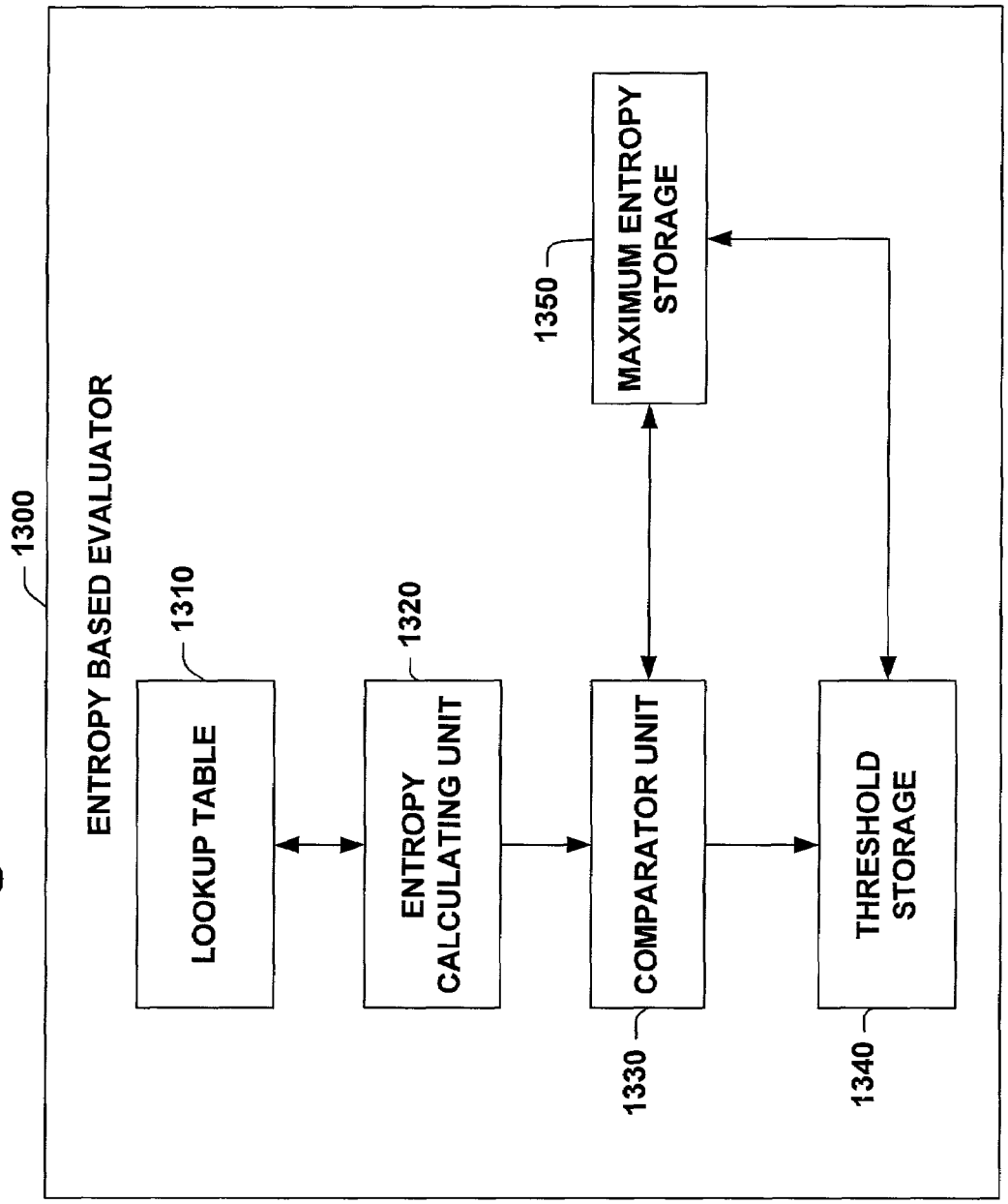
FIG. 13 illustrates an example entropy based evaluator portion of a neuron.

FIG. 13 illustrates an example entropy based evaluator 1300 portion of a neuron. The entropy based evaluator 1300 includes a lookup table 1310 and an entropy calculating unit 1320 that facilitates determining an entropy value based, at least in part, on one or more values retrieved from the lookup table 1310. The entropy based evaluator 1300 also includes a comparator unit 1330 that facilitates comparing an entropy value produced by the entropy calculating unit 1320, a value stored in a threshold storage 1340, and/or a value stored in the maximum entropy storage 1350. In one example, a neuron can selectively perform a transformation function on its data inputs to produce a data output based, at least in part, on the result produced by the comparator unit 1330.

Figure 14:
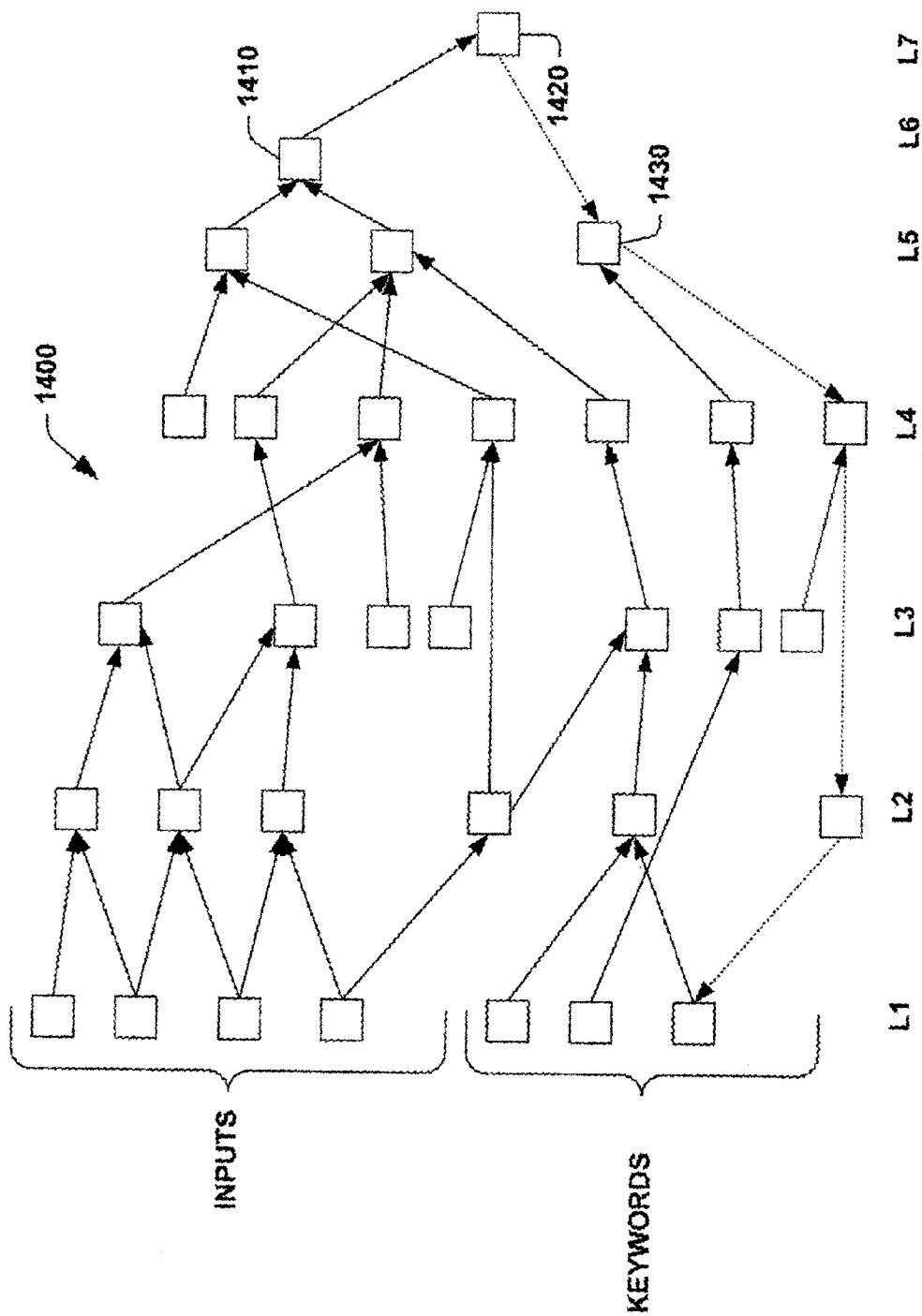
FIG. 14 illustrates an example training time neuronal examination that facilitates determining associations and/or association activity.

FIG. 14 illustrates an example training time examination of a neuron 1420. The training time examination facilitates determining associations and/or association activity in a self-organizing learning array. The neural network 1400 can be tasked with recognizing, classifying, and/or subdividing an input space provided via the inputs. Thus, in one example, the neural network 1400 will receive inputs and be tasked with recognizing a classification of a data in the inputs. During training of the network 1400, the network 1400 may generate associations. These associations can be captured in one or more neurons. During training, it is beneficial to examine neurons to determine the degree to which associations are being formed and in which neurons these associations are being formed. The systems and methods described herein do not try to force the network 1400 to produce an answer at a predefined output node. Thus, part of the training of a network like network 1400 concerns determining the "output nodes" where the associations are formed. In one example, during training, both a keyword (e.g., desired classification) and input data are presented. During a run, only the input data would be presented. By determining which node(s) code for the keyword, the association can be fed back to keyword lines to indicate a classification. Thus, if an associating neuron 1410 codes for an input, and an associating neuron 1430 codes for a keyword, another associating neuron 1420 can be employed to feed back information concerning the activity level of the associating node 1410 through a pathway that includes, for example, associating neuron 1430. Thus, a method for classifying a data point in an input data space using a self organized, local interconnection learning array may include receiving an input space vector and identifying one or more artificial neurons that code for associations with the input space vector and then providing an indicator of the one or more associations. In one example, the indicator can be a keyword line employed during training of the neural network for input and employed during run of the network as an output.

Figure 15:
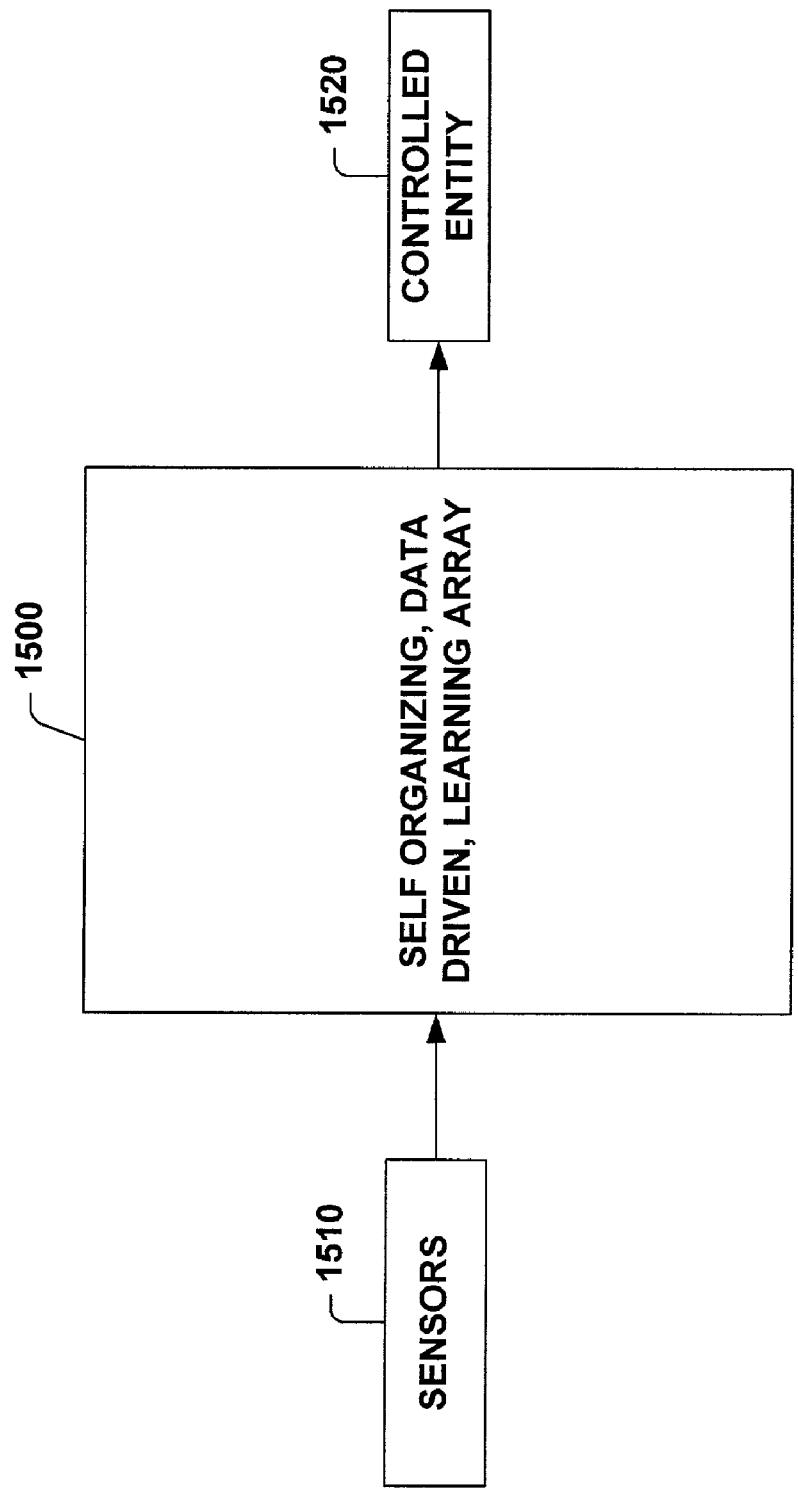
FIG. 15 illustrates an example self-organizing, data driven, training architecture operably coupled to input sensors and sending output signals to computer components.

FIG. 15 illustrates an example embodiment of a self-organizing, data driven training architecture 1500 operably coupled to input sensors 1510 and sending output signals to a controlled entity 1520. The self-organizing, data driven learning array 1500 can be implemented in systems including, but not limited to, a system on a chip, an FPGA, and a printed circuit board. The self-organizing, data driven, learning array 1500 can be employed in applications including, but not limited to, pattern recognition, intelligent control, robotics, automobile navigation, secure access, and positive identification.

The sensors 1510 can provide input signals from sensors including, but not limited to, optical sensors, range finding sensors, pressure sensors, temperature sensors, acceleration sensors, and so on. Similarly, the controlled entity 1520 can be, for example, a software system, a hardware system, and a computer component. The sensors 1510 can provide sensor data to the self-organizing data-driven learning array 1500 via, for example, a computer communication.

Figure 16:
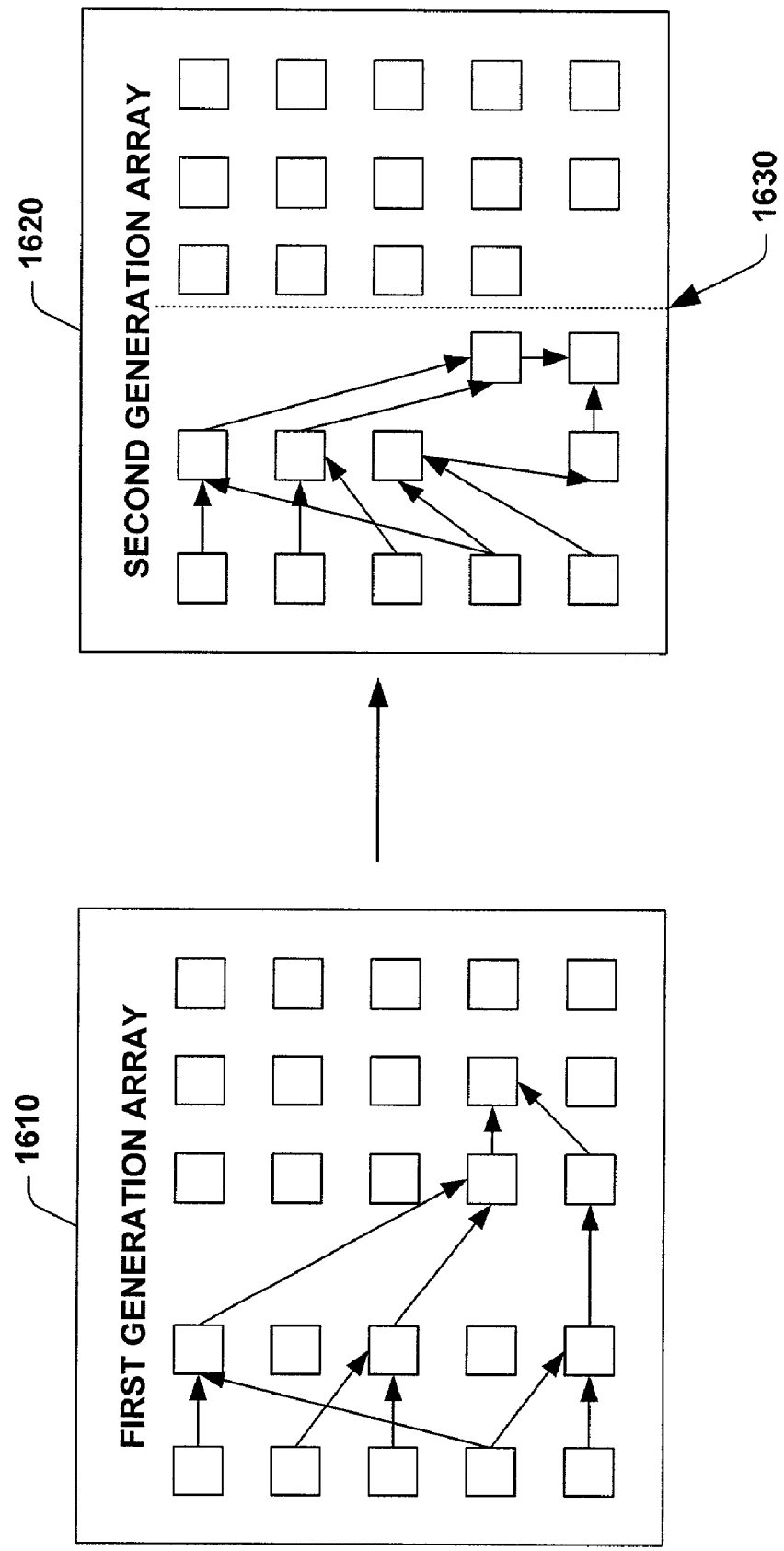
FIG. 16 illustrates an example second generation neural network produced from a first generation neural network produced by the self-organizing, data driven, local interconnection systems and methods described herein.

FIG. 16 illustrates an example second generation neural network 1620 produced from a first generation neural network 1610 that was produced by self-organizing, data driven local interconnection systems and methods desired herein. The first generation array 1610 may have, for example, X neurons initially available. These X neurons can be pseudo randomly connected with local interconnections favored. During training, the neurons can locally determine, substantially in parallel, local interconnections, transformation functions, and entropy based thresholds based on training data provided to the first generation array 1610. The first generation array 1610 can be trained up until neurons and/or pathways become active indicating that satisfactory associations have been made in the first generation array 1610. This training can leave a number of neurons free or non-associated. To facilitate generating deeper neurons, the first generation array 1600 can be designed onto a portion of a second generation array 1620, with the free neurons reorganized for subsequent processing like task refinement and/or a second task. The second generation array 1620 then evolves from the first generation array 1610. While two generations are illustrated in FIG. 16, it is to be appreciated that this evolutionary training is not limited to two generations. In the first generation array 1610 it can be seen that of the X neurons that are available, only Y neurons were employed. Thus, X-Y neurons are free for a second generation. In the second generation array 1620, the associations formed in the first generation array 1610 are fabricated into a chip, for example, using real estate to the left of a boundary 1630. Neurons not associated in the first generation 1610 can be arranged to the right of the boundary 1630. Then, the second generation array 1620 can be trained up for task refinement and/or a second task. Thus, in one example, a system for organizing a data driven learning array includes means for establishing an initial pseudo random array of self-organizing processors and means for training up the array of self-organizing processors to facilitate performing artificial neural network functions. Additionally, the system may be extended by adding means for selecting out of a trained up array associated neurons and unassociated neurons and then allocating the unassociated neurons to subsequent processing.

Figure 17:
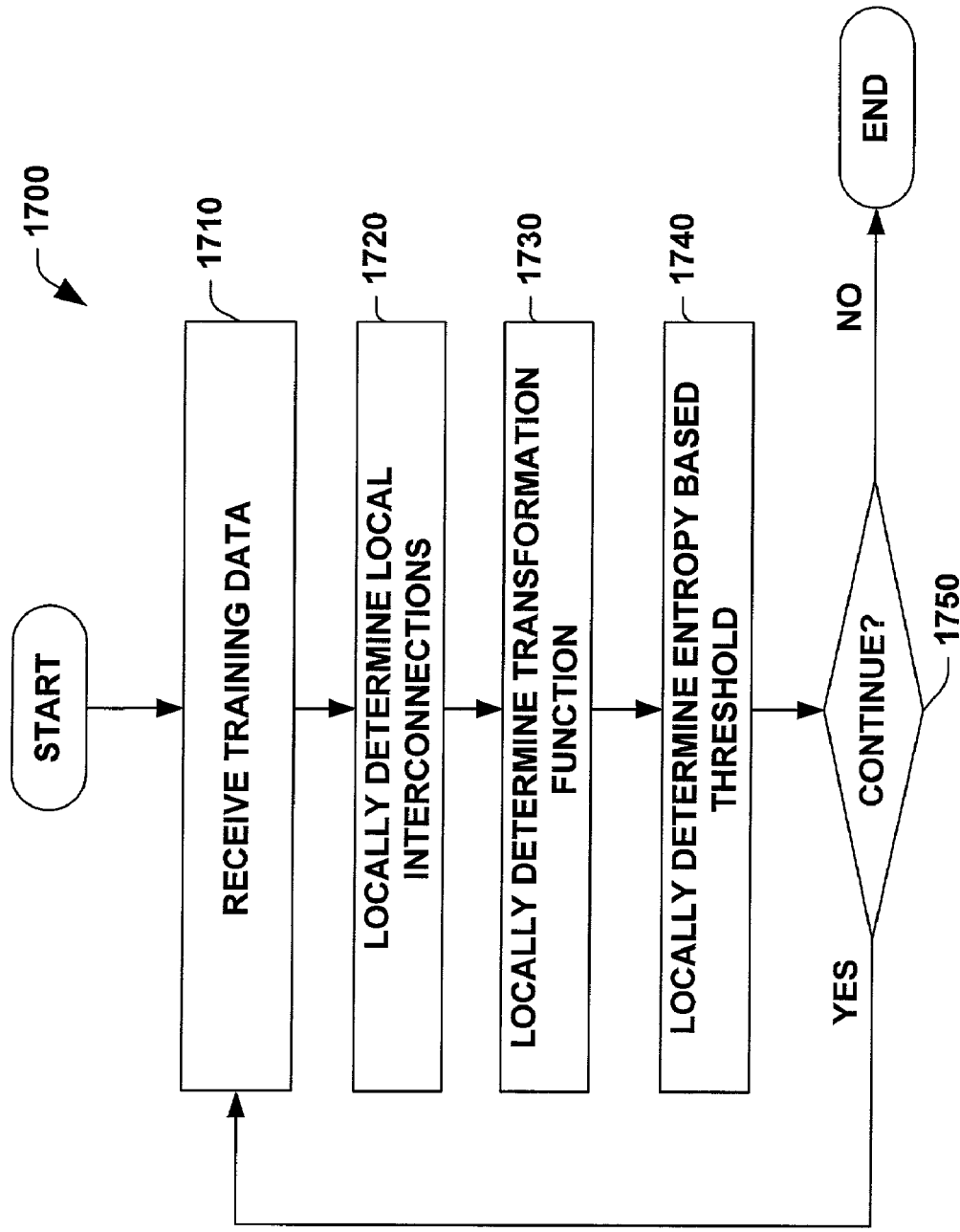
FIG. 17 is a flow chart that illustrates an example method for organizing cooperating processors.

In view of the exemplary systems shown and described herein, an example methodology that is implemented will be better appreciated with reference to the flow diagrams of FIG. 17. While for purposes of simplicity of explanation, the illustrated methodology is shown and described as a series of blocks, it is to be appreciated that the methodology is not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In one example, methodologies are implemented as computer executable instructions and/or operations, stored on computer readable media including, but not limited to an application specific integrated circuit (ASIC), a compact disc (CD), a digital versatile disk (DVD), a random access memory (RAM), a read only memory (ROM), a programmable read only memory (PROM), an electronically erasable programmable read only memory (EEPROM), a disk, a carrier wave, and a memory stick.

In the flow diagrams, rectangular blocks denote "processing blocks" that may be implemented, for example, in software. Similarly, the diamond shaped blocks denote "decision blocks" or "flow control blocks" that may also be implemented, for example, in software. Alternatively, and/or additionally, the processing and decision blocks can be implemented in functionally equivalent circuits like a digital signal processor (DSP), an application specific integrated circuit (ASIC), and the like.

A flow diagram does not depict syntax for any particular programming language, methodology, or style (e.g., procedural, object-oriented). Rather, a flow diagram illustrates functional information one skilled in the art may employ to program software, design circuits, and so on. It is to be appreciated that in some examples, program elements like temporary variables, routine loops, and so on are not shown.

FIG. 17 is a flow chart that illustrates an example method 1700 for organizing artificial neurons to facilitate performing artificial neural network tasks. The method 1700 includes initially pseudo randomly connecting a set of artificial neurons. Once the set of artificial neurons has been pseudo randomly connected, then, at 1710, a training data is received. At 1720, local interconnections between the pseudo randomly connected set of artificial neurons are locally determined. It is to be appreciated that the local interconnections are locally determined, substantially in parallel, by substantially all of the artificial neurons in the set of pseudo randomly connected artificial neurons. At 1730, a transformation function is locally determined by substantially each of the artificial neurons in the set of artificial neurons. The transformation functions between which a neuron can select include, but are not limited to, a linear function, a threshold function, an exponential function, a sigmoidal function, a logarithmic function, and a synaptic function.

At 1740, an entropy based threshold is locally determined by substantially each of the artificial neurons in the set of artificial neurons. At 1750, a determination is made concerning whether to continue the training. If the determination at 1750 is yes, then the method 1700 continues at 1710. Otherwise, the training can conclude. The training may continue until, for example, a level of activity in one or more associating neurons is determined to be above a predetermined, configurable threshold, until the training data has been partitioned, and/or until an information index value reaches a pre-determined, configurable threshold.

Figure 18:
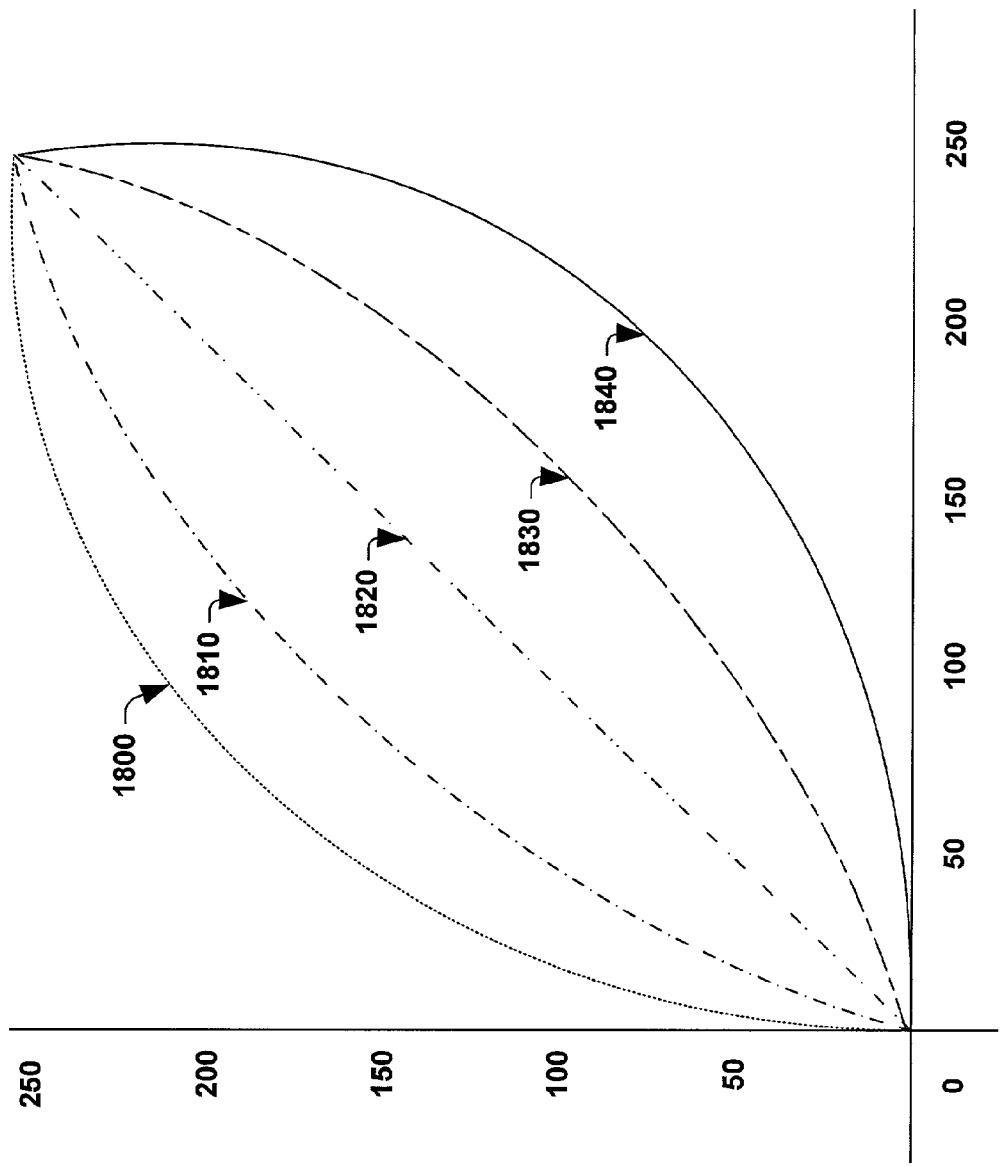
FIG. 18 illustrates a variety of example functions carving various paths through a data space to facilitate partitioning the input data space.

FIG. 18 illustrates a variety of example functions carving various paths that can partition an input data space. For example, curve 1800 carves a first path through an input data space while curves 1810, 1820, 1830, and 1840 each carve a different path through the data space. The path carved by curve 1800 leaves more area under the curve and less area above the curve. Conversely, the path carved by curve 1840 leaves a greater amount of data above the curve and a lesser amount of data below the curve. The curves can be carved, for example, by various functions performed by a reduced instruction set processor in a neuron. The curves can be carved, for example, by functions implemented in the reduced instruction processor including, but not limited to, a synaptic function, an inverse function, a square function, a square root function, a logarithmic function, and an exponential function.

Figure 19:
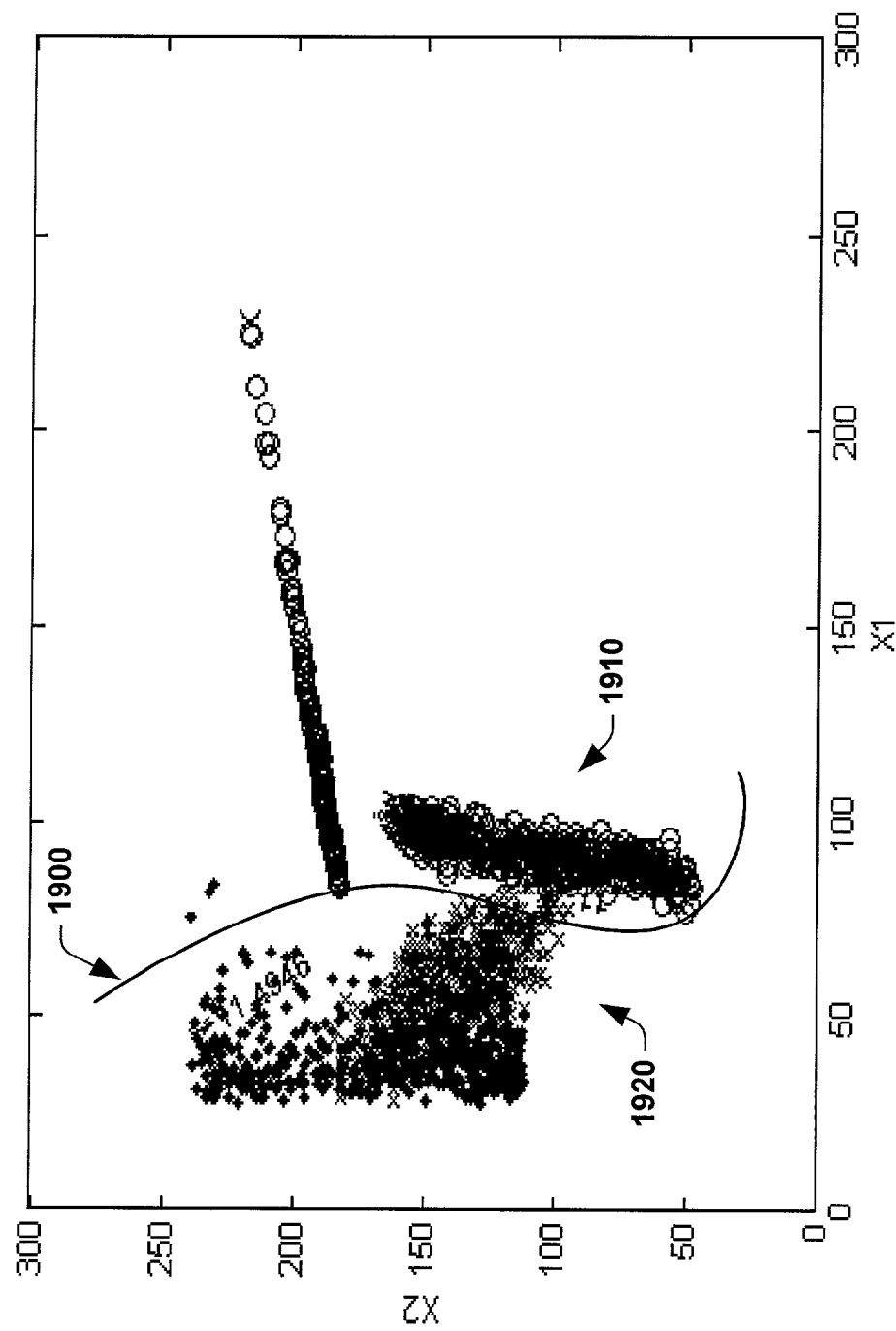
FIG. 19 illustrates a neuron partitioning an original input space.

FIG. 19 illustrates a curve 1900 produced by a neuron to facilitate partitioning an original input data space. The curve 1900 partitions the data into two subspaces 1910, and 1920. Similarly, FIG. 20 illustrates a curve 2000 cutting a local input space into two subspaces 2010 and 2020. Thus, from an initial data space as illustrated in FIG. 19, two subspaces 1910 and 1920 can be created. Then, by the operation of subsequent neurons, the data spaces 1910 and/or 1920 can be further partitioned as shown, for example, in FIG. 20.

This section provides one example of how a self-organizing learning array can interact with its input data. It is to be appreciated that self-organizing learning arrays can interact with their inputs in other manners. In the example, input data is presented to a self-organizing learning array with n input features. These n features form the dimensions of the input space. So jth individual inputs appear as an n-dimension vector: $X^j = [X^j_1, X^j_2 \ldots X^j_n]^T$. Therefore the data set, which consists of s individuals, could be organized in an input matrix, $$\bar{X} = \{X^1, \ldots X^s\} = \begin{bmatrix} X^1_1 X^2_1 \ldots X^s_1 \\ \ldots \\ X^1_n . X^2_n \ldots X^s_n \end{bmatrix}.$$

Some features may not be continuous numerical values and some may be in the form of discrete symbolic values. If the neuron operations accept only numerical inputs, the symbolic features benefit from being transformed into real numbers. Default values for features can be calculated to facilitate replacing missing features. For example, average values for missing feature selecting values that minimize the Mahalanobis distance to the cluster data from a given class can be employed. Since features are obtained from different measurements, their scale can vary. Thus, input features can be rescaled to equalize significance. As a result, one example pre-processing of a self-organizing learning array's input matrix can be carried out with three steps:

1. Make features numerical, set values for symbols of the discrete feature.

2. Determine default values for features, fill in blank items.

3. Rescale features to a unified range.

While the average values are easy to calculate, they may not accurately represent the existing distribution of the training data. Thus, Mahalanobis distance can be employed for missing data. To define Mahalanobis distance, use the mean value vector for a given class $m_c$ as well as a covariance matrix for training data from a class $C_c$. This can be performed, for example, using a MATLAB simulation. Then a given training data X with missing coordinates can be represented as $X=[X_k, X_m]$ where $X_k$ are known coordinates and the missing values $X_m$ are $$X_m = \{\tilde{X}_m : d(\tilde{X}_m) = d_{min}\} \quad \text{where} \quad d(X) = (X - m_c)^T C_c^{-1} (X - m_c).$$

Since d(X) is a quadratic form of the unknown values $X_m$, its minimum can be found by setting its derivative to zero.

$$\left.\frac{\partial d(X)}{\partial X_m}\right|_{x_m=\tilde{x}_m} = 0$$

Divide the inverse of covariance $C_c$ according to partition of X into known and missing values parts $$C_c^{-1} = D_c = \begin{bmatrix} D_{kk}, D_{km} \\ D_{mk}, D_{mm} \end{bmatrix}$$

Since $C_c$ is symmetrical $D_{mk} = D^T_{km}$ and $$\left[\frac{\partial d}{\partial X_1} \cdots \frac{\partial d}{\partial X_n}\right]^T = \begin{bmatrix} D_{kk}, D_{km} \\ D_{mk}, D_{mm} \end{bmatrix} \begin{bmatrix} X_k \\ X_m \end{bmatrix} = 0$$

As a result, $X_m$ can be obtained from:

$$X_m = -D^{-1}_{mm} D_{mk} X_k.$$

Since the covariance matrix can be estimated by using the sample vectors deviations from the nominal values Y as, $$C_c(Y) = \frac{1}{n-1}(Y_s)^T(Y_s)$$

where n is the number of samples.

After a self-organizing learning array input matrix is preprocessed, training data can be sent to the neurons. The neurons can operate on a full range of input features. Since self-organizing learning array neurons perform local learning, they will likely inherit data from local neighbors. The neurons in the later layers work on the data that has been processed by previous neurons in earlier layers. The neural operations can be designed, for example, based on simple elemental operations like identical, exponential, or logarithmic functions. Neurons can have a pre-defined set of operations that include "unary kernels" like identity, logarithm and exponential, and "binary kernels" like add and subtract operations.

For example, an 8 bit input has the range 0-255, so its neural operations can be designed as:
Identical function: Y=IDENT(x)=x,
Half function:

$$Y = \text{HALF}(x) = \frac{x}{2},$$

Logarithm function (non-linear): $Y = \text{NLOG2}(x) = 2^{\log_2(\max(1, \log_2(\max(1,x)))) + 5}$,
Exponential function (non-linear): $Y = \text{NEXP2}(x) = 2^{x/32}$,
Addition function: Y=NADD(x1,x2)=0.5(x1+x2),
Subtraction function: Y=NSUB(x1, x2)=max(x1−x2,0), Function outputs, except for the HALF function, may vary from 0 to 255 like the input range. Generally the outputs do not occupy the full range. Thus they may need to be rescaled. Although in this example digital operations are assumed, they could also be implemented in analog circuits.

Based on this set of functions, more complex derivative operations can be generated. In one example, a neuron can use either a single unary kernel or two unary kernels combined in a binary kernel.

A neuron may receive inputs directly from an input matrix or from previous neurons' outputs. In one example, a neuron is pre-wired with redundant data input and threshold-controlled input (TCI) connections. Using an entropy-based metric, known as an information index, one TCI and one or two input connections are selected with a unary/binary kernel operation for a neuron. A threshold of this operation can be determined to facilitate maximizing the metric.

Since an operation is a function of the data input(s), the input space will be separated into subspaces by using a neuron's threshold value. The subspace statistical information will be used for a final classification decision. The neuron's input space is a transformed original input space. Neurons transform the input space using selected operations. Since neurons in subsequent layers act upon the transformed input spaces from previously generated neurons, their operations on the original input space may become more complicated. An example of subspace division in the original input space is shown in FIG. 19. It can be found that the curve shown in FIG. 19 separates different classes efficiently, but clearly it is not a base operation.

To discern the relationship between a neuron's input and the original input space, neurons record their input connection sources after the training procedure. Neurons can trace back to find the transformation from the input features to their inputs resulting in an expression of input features $X_j$ and unary/binary kernels.

For instance, a neuron in the second layer operates on its input data as:

Operation=NSUB(HALF(Input1),NEXP2(Input2))

Input1 and Input2 are defined by neurons in the first layer and substituting for Input1 and Input2 and thus:

Operation=NSUB((HALF(NADD(NEXP2($X_{14}$), NLOG2($X_{11}$)))), NEXP2(NADD(HALF($X_8$), HALF($X_{10}$))))

or:

Operation =

$$\max\left(0, \frac{1}{4}(NEXP2(X_{14}) + NLOG2(X_{11})) - NEXP2\left(\frac{(X_8/2) + (X_{10}/2)}{2}\right)\right)$$

where

Input1=NADD(NEXP2($X_{14}$),NLOG2($X_{11}$))

and

Input2=NADD(HALF($X_8$),HALF($X_{10}$))

are inherited from the input data connections. Therefore this neuron's local input space based on Input1 and Input2 is a transformed input data space.

To accumulate learning results from different subspaces, consider the amount of added learning and weight it against increased system complexity and the resulting error in statistical learning. Define the subspace s information deficiency, which is a normalized relative subspace entropy, as $$\delta_s = \frac{\Delta E_s}{E\max} = \frac{\left[\sum_{sc} P_{sc}\log(P_{sc}) - P_s\log(P_s)\right]}{\sum_c P_c\log(P_c)}$$

Information deficiency indicates how much knowledge must be gained to resolve a classification problem in a given subspace. Initially, when a neuron receives its data from the neural network primary inputs as raw signal data, assume that the information index is zero, which means that the input information deficiency for the first layer of neurons is equal to 1. If the space was divided into several subspaces, then the information index and information deficiencies are related as $$1 - I = \sum_s \delta_s$$

Therefore, subspaces can be separately learned by minimizing information deficiency. If a new subspace is subdivided, a new information index $I_s$ in this subspace is obtained. To select which feature gives the largest local improvement in overall information, maximize the information deficiency reduction (IDR).

$$\max(Rs) = \delta_s I_s = \frac{\Delta E_s}{E\max}I_s = \delta_s\left(1 - \sum_{si}\delta_{si}\right)$$

Once the local feature is selected based on maximum deficiency reduction, its output carries the information deficiency for the next stage of learning. Define the output information deficiency as the product of the local subspace information deficiency with the input information deficiency. If the TCO is the same as the TCI for a given neuron, then the output information deficiency is equal to the input information deficiency. Otherwise it is a product of the input information deficiency and the subspace (T or TI) information deficiency.

In a local learning scheme, information can be stored using an information deficiencies vector rather than the raw information index. Then, the total information accumulated after the selected subspace is subdivided, where the deficiency reduction in the subspaces is summed, equals $$I_{tot} = 1 - \sum_s \delta_s(1 - I_s) = I + \sum_s R_s$$

This additive feature facilitates selecting the optimum local strategy where a local learning component can chose between different input spaces and optimize their partition. The learning strategy attempts to arrive at the largest value of $I_{tot}$. When subsequent space divisions occur, the information deficiency is replaced by the accumulated information deficiency expressed as a product of deficiencies in subsequent partitions, where the product is taken with respect to the partitions.

$$\Delta_p = \Pi_p \delta_S$$

To reduce wiring in a locally interconnected set of neurons, pass the value of accumulated information deficiency to a subsequent neuron as its input information deficiency. Thus, the accumulated information deficiency of a subspace becomes the output information deficiency of a neuron and the input information deficiency of the following neuron, once the particular subspace created in the feeding neuron is selected as a TCI of the subsequent neuron.

$$\delta_{in} = \Delta_p$$

The deficiency reduction is calculated using a product of the accumulated information deficiency and the subspace information index.

$$R_s = \delta_{in} I_s$$

The systems, methods, and objects described herein may be stored, for example, on a computer readable media. Media can include, but are not limited to, an application specific integrated circuit (ASIC), a compact disc (CD), a digital versatile disk (DVD), a random access memory (RAM), a read only memory (ROM), a programmable read only memory (PROM), a disk, a carrier wave, a memory stick, and the like. Thus, an example computer readable medium can store computer executable instructions for a method for organizing artificial neurons into a locally interconnected arrangement that facilitates performing artificial neural network tasks. The method includes pseudo randomly connecting a set of artificial neurons, receiving a training data and locally determining, substantially in parallel, for the artificial neurons, one or more of a local interconnection, a transformation function, and an entropy based threshold, where the local determinations are based, at least in part, on the input data.

What has been described above includes several examples. It is, of course, not possible to describe every conceivable combination of components or methodologies for purposes of describing the methods, systems, computer readable media and so on employed in a self-organizing, data driven, learning hardware with local interconnections. However, one of ordinary skill in the art may recognize that further combinations and permutations are possible. Accordingly, this application is intended to embrace alterations, modifications, and variations that fall within the scope of the appended claims. Furthermore, to the extent that the term "includes" is employed in the detailed description or the claims, it is intended to be inclusive in a manner similar to the term "comprising" as that term is interpreted when employed as a transitional word in a claim.

What is claimed is:

1. A self-organizing apparatus, comprising:
   a plurality of artificial neurons arranged in multiple layers;
   a plurality of initial interconnections interconnecting the plurality of artificial neurons to form an initial configuration of a self-organizing learning array in which less than total interconnection is undertaken between adjacent layers;
   one or more learning array input nodes, each learning array input node connected to at least one artificial neuron; and
   the plurality of artificial neurons including a first self-organizing artificial neuron comprising: an entropy-based evaluator determining entropy of an input data space associated with the first self-organizing artificial neuron, wherein at least one of i) selection of initial interconnections to retain as neuron input connections to the first self-organizing artificial neuron and ii) selection of a transformation function to be applied by the first self-organizing artificial neuron is based at least in part on the determined entropy;

wherein the plurality of artificial neurons includes one or more self-organizing artificial neurons each self-organizing artificial neuron independently determines the initial interconnections associated therewith to retain as neuron input connections and the initial interconnections associated therewith to release in response to training data being applied to the one or more learning array input nodes, the retained interconnections forming a trained configuration of the self-organizing learning array;

wherein the first self-organizing artificial neuron determines the entropy of the input data space in response to training data being applied to the one or more learning array input nodes.

2. The apparatus of claim 1 wherein the number of retained interconnections is less than the number of initial interconnections in quantity.

3. The apparatus of claim 1 wherein determining which initial interconnections are retained at the corresponding self-organizing artificial neuron is based at least in part on showing favoritism to interconnections from neighboring artificial neurons.

4. The apparatus of claim 1 wherein determining which initial interconnections are retained is based at least in part on reducing entropy in an input data space associated with the corresponding self-organizing artificial neuron.

5. The apparatus of claim 1, the plurality of artificial neurons including first self-organizing artificial neuron comprising:

an input data multiplexer selectively connecting and disconnecting one or more initial interconnections providing input data signals to the first self-organizing artificial neuron;

wherein the first self-organizing artificial neuron selects the input data signals for connection and disconnection in response to training data being applied to the one or more learning array input nodes.

6. The apparatus of claim 5, the first self-organizing artificial neuron further comprising:

a memory for storing a value for an entropy-based threshold associated with the first self-organizing artificial neuron;

wherein the first self-organizing artificial neuron determines the value for the entropy-based threshold in response to training data being applied to the one or more learning array input nodes.

7. The apparatus of claim 5, the first self-organizing artificial neuron further comprising:

an input control multiplexer selectively connecting and disconnecting one or more initial interconnections providing input control signals to the first self-organizing artificial neuron;

wherein the first self-organizing artificial neuron selects the input control signals for connection and disconnection in response to training data being applied to the one or more learning array input nodes.

8. The apparatus of claim 1, the plurality of artificial neurons including first self-organizing artificial neuron comprising:

a neuronal processor selectively applying a transformation function to input data signals provided to the first self-organizing artificial neuron by one or more initial interconnections associated with the initial configuration of the self-organizing learning array or one or more retained interconnections associated with the trained configuration of the self-organizing learning array, thus contributing to partitioning of an input data space associated with the first self-organizing artificial neuron;

wherein the first self-organizing artificial neuron selects the transformation function to be applied in response to training data being applied to the one or more learning array input nodes.

9. The apparatus of claim 8, the first self-organizing artificial neuron further comprising:

a memory for storing a value for an entropy-based threshold associated with the first self-organizing artificial neuron;

wherein the first self-organizing artificial neuron determines the value for the entropy-based threshold in response to training data being applied to the one or more learning array input nodes.

10. The apparatus of claim 8, the first self-organizing artificial neuron further comprising:

an input control multiplexer selectively connecting and disconnecting one or more initial interconnections providing input control signals to the first self-organizing artificial neuron;

wherein the first self-organizing artificial neuron selects the input control signals for connection and disconnection in response to training data being applied to the one or more learning array input nodes.

11. The apparatus of claim 8, the neuronal processor comprising:

a reduced instruction set processor selectively applying the transformation function to input data signals provided to the first self-organizing artificial neuron by one or more initial interconnection associated with the initial configuration of the self-organizing learning array or one or more retained interconnections associated with the trained configuration of the self-organizing learning array, thus contributing to partitioning the input data space associated with the first self-organizing artificial neuron.

12. The apparatus of claim 1 the first self-organizing artificial neuron further comprising:

a memory for storing a value for an entropy-based threshold associated with the first self-organizing artificial neuron;

wherein the first self-organizing artificial neuron determines the value for the entropy-based threshold in response to training data being applied to the one or more learning array input nodes.

13. The apparatus of claim 1 the first self-organizing artificial neuron further comprising:

an input control multiplexer selectively connecting and disconnecting of one or more initial interconnections providing input control signals to the first self-organizing artificial neuron;

wherein the first self-organizing artificial neuron selects the input control signals for connection and disconnection in response to training data being applied to the one or more learning array input nodes.

14. The apparatus of claim 1 the entropy-based evaluator comprising:

a lookup table storing a plurality of lookup values associated with entropy of the input data space;
a threshold storage storing a threshold value associated with entropy of the input data space;
an entropy calculating unit determining an entropy value based at least in part on one or more lookup values retrieved from the lookup table; and a comparator unit comparing the determined entropy value and the threshold value to determine an entropy result;
wherein the first self-organizing artificial neuron selects the transformation function to be applied based at least in part on the entropy result.

15. The apparatus of claim 1 the entropy-based evaluator comprising:
a lookup table storing a plurality of lookup values associated with entropy of the input data space;
a maximum entropy storage storing a maximum entropy value associated with entropy of the input data space;
an entropy calculating unit determining an entropy value based at least in part on one or more lookup values retrieved from the lookup table; and
a comparator unit comparing the determined entropy value and the maximum entropy value to determine an entropy result;
wherein the first self-organizing artificial neuron selects the transformation function to be applied based at least in part on the entropy result.

16. A self-organizing artificial neuron, comprising:
one or more neuron data inputs adapted to receive corresponding input data signals;
an input data multiplexer selectively connecting and disconnecting one or more of the input data signals;
a neuronal processor selectively applying a transformation function to one or more connected input data signals, thus contributing to partitioning of an input data space associated with the self-organizing artificial neuron; and
an entropy-based evaluator determining entropy of the input data space associated with the self-organizing artificial neuron, wherein at least one of i) selection of the input data signals for connection and disconnection and ii) selection of the transformation function to be applied by the self-organizing artificial neuron is based at least in part on the determined entropy;
wherein the self-organizing artificial neuron selects the input data signals for, connection and disconnection in response to training data being operatively communicated to the self-organizing artificial neuron;
wherein the self-organizing artificial neuron determines the transformation function to be applied in response to training data being operatively communicated to the self-organizing artificial neuron;
wherein the self-organizing artificial neuron determines the entropy of the input data space in response to training data being operatively communicated to the self-organizing artificial neuron.

17. The artificial neuron of claim 16, further comprising:
a memory for storing a value for an entropy-based threshold associated with the self-organizing artificial neuron;
wherein the self-organizing artificial neuron determines the value for the entropy-based threshold in response to training data being operatively communicated to the self-organizing artificial neuron.

18. The artificial neuron of claim 16, further comprising:
one or more neuron control inputs adapted to receive corresponding input control signals; and
an input control multiplexer selectively connecting and disconnecting one or more of the received input control signals; and
wherein the self-organizing artificial neuron selects the input control signals for connection and disconnection in response to training data being operatively communicated to the self-organizing artificial neuron.

19. A self-organizing artificial neuron, comprising:
one or more neuron data inputs adapted to receive corresponding input data signals;
an input data multiplexer selectively connecting and disconnecting one or more of the input data signals; and
an entropy-based evaluator determining entropy of an input data space associated with the self-organizing artificial neuron, wherein at least one of i) selection of the input data signals for connection and disconnection and ii) selection of a transformation function to be applied by the self-organizing artificial neuron is based at least in part on the determined entropy;
wherein the self-organizing artificial neuron selects the input data signals for connection and disconnection in response to training data being operatively communicated to the self-organizing artificial neuron;
wherein the self-organizing artificial neuron determines the entropy of the input data space in response to training data being operatively communicated to the self-organizing artificial neuron.

20. The artificial neuron of claim 19, further comprising:
a memory for storing a value for an entropy-based threshold associated with the self-organizing artificial neuron;
wherein the self-organizing artificial neuron determines the value for the entropy-based threshold in response to training data being operatively communicated to the self-organizing artificial neuron.

21. The artificial neuron of claim 19, further comprising:
one or more neuron control inputs adapted to receive corresponding input control signals; and
an input control multiplexer selectively connecting and disconnecting one or more of the received input control signals; and
wherein the self-organizing artificial neuron selects the input control signals for connection and disconnection in response to training data being operatively communicated to the self-organizing artificial neuron.

22. A self-organizing artificial neuron, comprising:
one or more neuron data inputs adapted to receive corresponding input data signals;
a neuronal processor selectively applying a transformation function to one or more input data signals, thus contributing to partitioning of an input data space associated with the self-organizing artificial neuron; and
an entropy-based evaluator determining entropy of the input data space associated with the self-organizing artificial neuron, wherein at least one of i) selection of the input data signals for connection and disconnection at the self-organizing artificial neuron and ii) selection of the transformation function to be applied by the self-organizing artificial neuron is based at least in part on the determined entropy;
wherein the self-organizing artificial neuron determines the transformation function to be applied in response to training data being operatively communicated to the self-organizing artificial neuron;
wherein the self-organizing artificial neuron determines the entropy of the input data space in response to training data being operatively communicated to the self-organizing artificial neuron.

23. The artificial neuron of claim 22, further comprising:
a memory for storing a value for an entropy-based threshold associated with the self-organizing artificial neuron;
wherein the self-organizing artificial neuron determines the value for the entropy-based threshold in response to training data being operatively communicated to the self-organizing artificial neuron.

24. The artificial neuron of claim 22, further comprising:
one or more neuron control inputs adapted to receive corresponding input control signals; and
an input control multiplexer selectively connecting and disconnecting of one or more of the received input control signals; and
wherein the self-organizing artificial neuron selects the input control signals for connection and disconnection in response to training data being operatively communicated to the self-organizing artificial neuron.

25. A method for training a self-organizing apparatus, comprising:
a) arranging a plurality of artificial neurons in multiple layers, the plurality of artificial neurons including one or more self-organizing artificial neuron;
b) interconnecting the plurality of artificial neurons with a plurality of initial interconnections to form an initial configuration of a self-organizing learning array, where less than total interconnection is undertaken between adjacent layers;
c) connecting each of one or more learning array input nodes to at least one artificial neuron;
d) applying training data to the one or more learning array input nodes;
e) at each self-organizing artificial neurons, independently determining initial interconnections associated therewith to retain as neuron input connections and initial interconnections associated therewith to release in response to the training data applied in d);
f) forming a trained configuration of the self-organizing learning array based at least in part on the retained interconnnections; and
g) at a first self-organizing artificial neuron, independently determining entropy of an input data space associated with the first self-organizing artificial neuron based at least in part on the training data applied in d), wherein at least one of i) selecting initial interconnections to retain in e) and ii) selecting a transformation function to be applied by the first self-organizing artificial neuron is based at least in part on the determined entropy.

26. The method of claim 25, further comprising:
h) at a first self-organizing artificial neuron, independently and selectively connecting and disconnecting one or more initial interconnections providing input data signals to the first self-organizing artificial neuron, selection of the input data signals for connecting and disconnecting being based at least in part on the training data applied in d).

27. The method of claim 26, further comprising:
i) at the first self-organizing artificial neuron, independently determining a value for an entropy-based threshold associated with the first self-organizing artificial neuron based at least in part on the training data applied in d); and
j) at the first self-organizing artificial neuron, storing the value for an entropy-based threshold in a memory.

28. The method of claim 26, further comprising:
i) at the first self-organizing artificial neuron, independently and selectively connecting and disconnecting one or more initial interconnections providing input control signals to the first self-organizing artificial neuron, selection of the input control signals for connecting and disconnecting being based at least in part on the training data applied in d).

29. The method of claim 25, further comprising:
h) at a first self-organizing artificial neuron, independently and selectively applying a transformation function to input data signals provided to the first self-organizing artificial neuron by one or more initial interconnections associated with the initial configuration of the self-organizing learning array or one or more retained interconnections associated with the trained configuration of the self-organizing learning array to at least partially partition an input data space associated with the first self-organizing artificial neuron, selection of the transformation function to be applied being based at least in part on the training data applied in d).

30. The method of claim 29, further comprising:
i) at the first self-organizing artificial neuron, independently determining a value for an entropy-based threshold associated with the first self-organizing artificial neuron based at least in part on the training data applied in d); and
j) at the first self-organizing artificial neuron, storing the value for an entropy-based threshold in a memory.

31. The method of claim 29, further comprising:
i) at the first self-organizing artificial neuron, independently and selectively connecting and disconnecting one or more initial interconnections providing input control signals to the first self-organizing artificial neuron, selection of the input control signals for connecting and disconnecting being based at least in part on the training data applied in d).

32. The method of claim 25, further comprising:
h) at the first self-organizing artificial neuron, independently determining a value for an entropy-based threshold associated with the first self-organizing artificial neuron based at least in part on the training data applied in d); and
i) at the first self-organizing artificial neuron, storing the value for an entropy-based threshold in a memory.

33. The method of claim 25, further comprising:
h) at the first self-organizing artificial neuron, independently and selectively connecting and disconnecting one or more initial interconnections providing input control signals to the first self-organizing artificial neuron, selection of the input control signals for connecting and disconnecting being based at least in part on the training data applied in d).

34. The method of claim 25, further comprising:
h) at the first self-organizing artificial neuron, independently determining an entropy value based at least in part on one or more stored lookup values; and
i) at the first self-organizing artificial neuron, independently comparing the determined entropy value to a stored threshold value to determine an entropy result, wherein selection of the transformation function in g) is based at least in part on the entropy result.

35. The method of claim 25, further comprising:
h) at the first self-organizing artificial neuron, independently determining an entropy value based at least in part on one or more stored lookup values; and i) at the first self-organizing artificial neuron, independently comparing the determined entropy value to a stored maximum entropy value to determine an entropy result, wherein selection of the transformation function in g) is based at least in part on the entropy result.

36. A method for training a self-organizing artificial neuron, comprising:
   a) receiving one or more input data signals at corresponding neuron data inputs of the self-organizing artificial neuron;
   b) at the self-organizing artificial neuron, independently and selectively connecting and disconnecting one or more of the input data signals, selection of the input data signals for connecting and disconnecting being based at least in part on training data operatively communicated to the self-organizing artificial neuron;
   c) at the self-organizing artificial neuron, independently and selectively applying a transformation function to one or more connected input data signals to at least partially partition an input data space associated with the self-organizing artificial neuron, selection of the transformation function to be applied being based at least in part on training data operatively communicated to the self-organizing artificial neuron; and
   d) at the self-organizing artificial neuron, independently determining entropy of the input data space associated with the self-organizing artificial neuron based at least in part on training data operatively communicated to the self-organizing artificial neuron, wherein at least one of i) selecting the input data signals for connecting and disconnecting in b) and ii) selecting the transformation function to be applied in c) is based at least in part on the determined entropy.

37. The method of claim 36, further comprising:
   e) at the self-organizing artificial neuron, independently determining a value for an entropy-based threshold associated with the self-organizing artificial neuron based at least in part on training data operatively communicated to the self-organizing artificial neuron; and
   f) at the self-organizing artificial neuron, independently storing the value for the entropy-based threshold in a memory.

38. The method of claim 36, further comprising:
   e)-receiving one or more input control signals at corresponding neuron control inputs of the self-organizing artificial neuron; and
   f) at the self-organizing artificial neuron, independently and selectively connecting and disconnecting one or more of the received input control signals, selection of the received input control signals for connecting and disconnecting being based at least in part on training data operatively communicated to the self-organizing artificial neuron.

39. A method for training a self-organizing artificial neuron, comprising:
   a) receiving one or more input data signals at corresponding neuron data inputs of the self-organizing artificial neuron;
   b) at the self-organizing artificial neuron, independently and selectively connecting and disconnecting one or more of the input data signals, selection of the input data signals for connecting and disconnecting being based at least in part on training data operatively communicated to the self-organizing artificial neuron; and
   c) at the self-organizing artificial neuron, independently determining entropy of the input data space associated with the self-organizing artificial neuron based at least in part on training data operatively communicated to the self-organizing artificial neuron, wherein at least one of i) selecting the input data signals for connecting and disconnecting in b) and ii) selecting a transformation function to be applied by the self-organizing artificial neuron is based at least in part on the determined entropy.

40. The method of claim 39, further comprising:
   d) at the self-organizing artificial neuron, independently determining a value for an entropy-based threshold associated with the self-organizing artificial neuron based at least in part on training data operatively communicated to the self-organizing artificial neuron; and
   e) at the self-organizing artificial neuron, independently storing the value for the entropy-based threshold in a memory.

41. The method of claim 39, further comprising:
   d) receiving one or more input control signals at corresponding neuron control inputs of the self-organizing artificial neuron; and
   e) at the self-organizing artificial neuron, independently and selectively connecting and disconnecting one or more of the received input control signals, selection of the received input control signals for connecting and disconnecting being based at least in part on training data operatively communicated to the self-organizing artificial neuron.

42. A method for training a self-organizing artificial neuron, comprising:
   a) receiving one or more input data signals at corresponding neuron data inputs of the self-organizing artificial neuron;
   b) at the self-organizing artificial neuron, independently and selectively applying a transformation function to one or more input data signals to at least partially partition an input data space associated with the self-organizing artificial neuron, selection of the transformation function to be applied being based at least in part on training data operatively communicated to the self-organizing artificial neuron; and
   c) at the self-organizing artificial neuron, independently determining entropy of the input data space associated with the self-organizing artificial neuron based at least in part on training data operatively communicated to the self-organizing artificial neuron, wherein at least one of i) selecting input data signals for connecting and disconnecting at the self-organizing artificial neuron and ii) selecting the transformation function to be applied in b) is based at least in part on the determined entropy.

43. The method of claim 42, further comprising:
   d) at the self-organizing artificial neuron, independently determining a value for an entropy-based threshold associated with the self-organizing artificial neuron based at least in part on training data operatively communicated to the self-organizing artificial neuron; and
   e) at the self-organizing artificial neuron, independently storing the value for the entropy-based threshold in a memory.

44. The method of claim 42, further comprising:

d) receiving one or more input control signals at corresponding neuron control inputs of the self-organizing artificial neuron; and e) at the self-organizing artificial neuron, independently and selectively connecting and disconnecting one or more of the received input control signals, selection of the received input control signals for connecting and disconnecting being based at least in part on training data operatively communicated to the self-organizing artificial neuron.

* * * * *

UNITED STATES PATENT AND TRADEMARK OFFICE
CERTIFICATE OF CORRECTION

PATENT NO. : 7,293,002 B2  Page 1 of 1
APPLICATION NO. : 10/174038
DATED : November 6, 2007
INVENTOR(S) : Janusz A. Starzyk It is certified that error appears in the above-identified patent and that said Letters Patent is hereby corrected as shown below:

Col. 21, line 10, please change "neurons" to read --neuron-- and insert a comma --,-- after the changed word "neuron".

Col. 22, line 46, please insert a comma --,-- after the phrase "claim 1".

Col. 22, line 55, please insert a comma --,-- after the phrase "claim 1".

Col. 22, line 58, delete "of".

Col. 23, line 46, delete the comma ",".

Col. 25, line 35, please change "neurons" to read --neuron--.

Signed and Sealed this

Twenty-ninth Day of April, 2008

JON W. DUDAS
*Director of the United States Patent and Trademark Office*